United States Patent
Kobayashi et al.

(10) Patent No.: US 7,752,936 B2
(45) Date of Patent: Jul. 13, 2010

(54) AUTOMATIC TRANSMISSION ASSEMBLY FOR A VEHICLE, AND VEHICLE INCORPORATING SAME

(75) Inventors: Masaki Kobayashi, Saitama (JP); Seiji Hamaoka, Saitama (JP); Kinya Mizuno, Saitama (JP); Eiji Kittaka, Saitama (JP); Yusuke Funayose, Saitama (JP); Kazuhiko Sakaguchi, Saitama (JP); Hiroshi Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 12/070,424

(22) Filed: Feb. 19, 2008

(65) Prior Publication Data

US 2008/0220936 A1 Sep. 11, 2008

(30) Foreign Application Priority Data

Mar. 6, 2007 (JP) ............................. 2007-056274
Mar. 6, 2007 (JP) ............................. 2007-056275

(51) Int. Cl.
*F16H 59/00* (2006.01)
(52) U.S. Cl. ..................................... 74/337.5
(58) Field of Classification Search ........................ None
See application file for complete search history.

(56) References Cited

U.S. PATENT DOCUMENTS

| 5,966,989 | A | 10/1999 | Reed, Jr. et al. | |
| 7,487,691 | B2 * | 2/2009 | Kapp et al. | 74/337.5 |
| 7,631,570 | B2 * | 12/2009 | Mizuno et al. | 74/331 |
| 2008/0184844 | A1 | 8/2008 | Mizuno et al. | |
| 2009/0165582 | A1 * | 7/2009 | Tsunashima et al. | 74/331 |

FOREIGN PATENT DOCUMENTS

| EP | 1 906 065 A1 | 4/2008 |
| JP | 3325843 | 7/2002 |
| JP | 2006-052748 | 2/2006 |

* cited by examiner

*Primary Examiner*—Dirk Wright
(74) *Attorney, Agent, or Firm*—Carrier, Blackman & Associates, P.C.; William D. Blackman; Joseph P. Carrier

(57) ABSTRACT

An automatic transmission assembly having a transmission unit including a plurality of gear pairs, a shift drum, a pair of clutches; and a controller. The controller performs a preliminary upshifting action in advance for angularly moving the shift drum depending on a next gear position in an upshifting direction while rotary drive power is being maintained at a given gear position, and when an upshifting command is output, the controller engages one of the clutches simultaneously with the command. When a downshifting command is output, the controller performs a preliminary downshifting action in advance based on the downshifting command. The partially neutral positions are provided between predetermined angular positions on the shift drum for temporarily reducing the angular speed of the shift drum when the shift drum is being angularly rotated.

20 Claims, 16 Drawing Sheets

UPON DOWNSHIFTING FROM THIRD GEAR POSITION TO SECOND GEAR POSITION

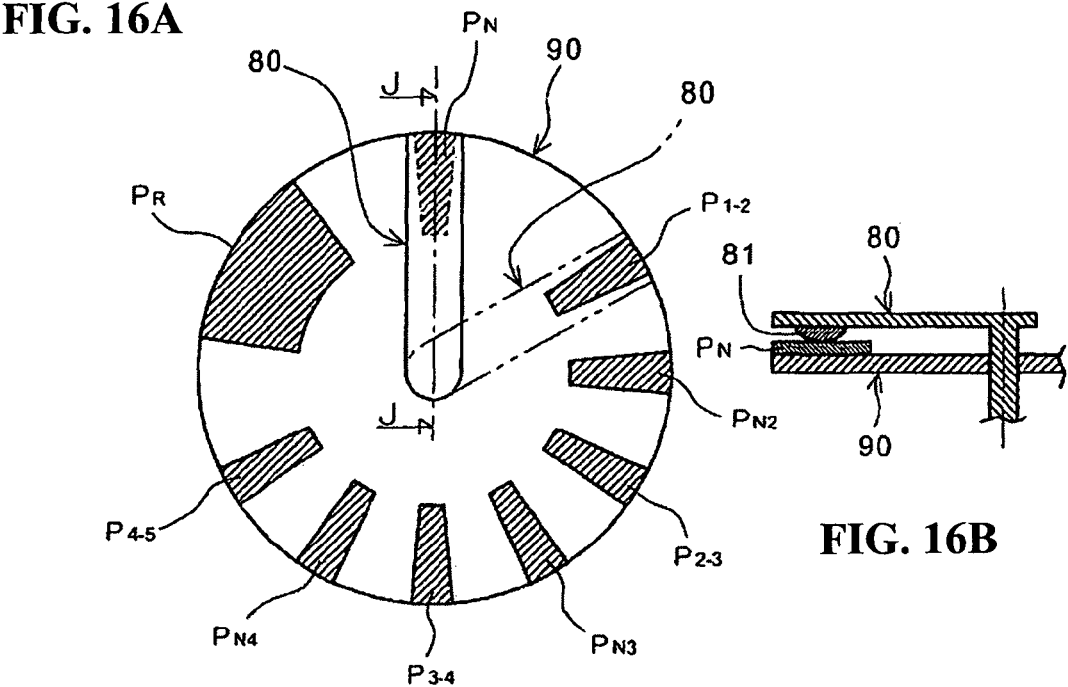
FIG. 16A
FIG. 16B
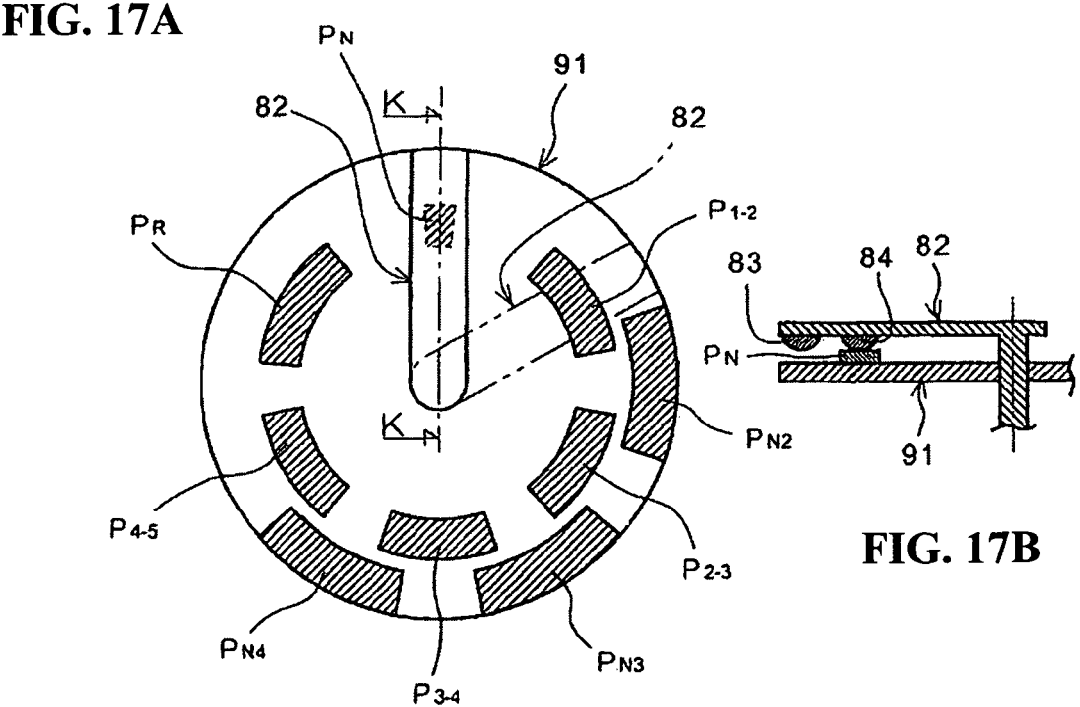
FIG. 17A
FIG. 17B

AUTOMATIC TRANSMISSION ASSEMBLY FOR A VEHICLE, AND VEHICLE INCORPORATING SAME

CROSS-REFERENCE TO RELATED APPLICATIONS

The present application claims priority under 35 USC §119 based on Japanese patent applications Nos. 2007-056275 and 2007-056274, both filed on Mar. 6, 2007. The entire subject matter of each of these priority documents is incorporated by reference herein.

BACKGROUND OF THE INVENTION

1. Field of the Invention

The present invention relates to an automatic transmission assembly for a power unit of a vehicle. More particularly, the present invention relates to an automatic transmission assembly configured and arranged for shortening a gear shifting time in both upshifting and downshifting of gears, and for controlling gear shifting for a partially neutral position on a shift drum of the automatic transmission assembly.

2. Description of the Background Art

There are a number of known automatic transmissions assemblies having a twin clutch assembly including two clutches (a first clutch and a second clutch) disposed between a crankshaft of an engine and the transmission unit. In these known automatic transmission assemblies, concurrently with a gear shifting operation performed by an actuator, the first clutch and the second clutch are alternately engaged and disengaged to successively change gears, without interrupting the transmission of drive power from the engine.

An example of such a known automatic transmission assembly is disclosed in Japanese Laid-Open Patent No. 2006-52748, which discloses a transmission unit capable of shifting between two adjacent gear positions by changing engaged and disengaged states of first and second clutches when a shift drum for actuating shift forks is in a certain angular position.

While the drive power from the crankshaft of the engine is being transmitted by the transmission in a certain gear position, a preliminary gear shifting action is performed for angularly moving the shift drum to an angular position, in advance, depending on a next gear position in an upshifting direction for shortening a gear upshifting time.

However, the transmission assembly disclosed in Japanese Laid-Open Patent document No. 2006-52748 is aimed at shortening the gear shifting time for upshifting only, and does not address shortening a gear shifting time for downshifting. Also, a detailed timing for actuating a twin clutch assembly for shortening the gear shifting time for upshifting is not considered in the Japanese Patent document No. 2006-52748.

The present invention has been made to overcome such drawbacks. Accordingly, it is one object of the present invention to provide an automatic transmission assembly which overcomes drawbacks of the transmission assembly as disclosed in the Japanese Patent document No. 2006-52748, and which is capable of shortening a gear shifting time for both upshifting and downshifting of gears.

Further, there are known transmissions for shifting gears with a shift fork which can be actuated in response to angular movement of a shift drum. Such transmissions include a sensor for detecting the angular position of the shift drum and a present gear position.

An example of such known transmissions for shifting gears with a shift fork is discussed in the Japanese Patent No. 3325843, which discloses an arrangement in which a sensor having a fixed contact point and a movable contact point is disposed on an axial end of a shift drum, and a present gear position is detected based on a signal from the sensor.

However, the Japanese Patent No. 3325843 does not address a transmission having a partially neutral position intermediate between given angular positions corresponding to respective gear positions for temporarily reducing the angular speed of a shift drum upon gear shifting, and does not consider detecting a partially neutral position and performing corresponding gear shifting control.

Accordingly, it is also an object of the present invention to provide an automatic transmission assembly which solves the above problems of the Japanese Patent No. 3325843, and which is capable of performing gear shifting control corresponding to a partly neutral position of a shift drum.

SUMMARY OF THE INVENTION

In order to achieve the above objects, a first aspect of the present invention provides an automatic transmission assembly for transmitting rotary power from a crankshaft to a drive train component. The automatic transmission assembly according to the first aspect includes a main shaft, an auxiliary shaft, a transmission unit including a plurality of gear pairs for providing gear positions between the main shaft and the auxiliary shaft, and a twin clutch assembly having first and second clutches disposed on the main shaft or the auxiliary shaft for selectively transmitting rotary drive power between the crankshaft and the transmission unit.

The automatic transmission assembly, according to the first aspect hereof, further includes a controller for changing the angular position of a shift drum for actuating a shift fork and the engagement and disengagement of the twin clutch assembly to selecting one of the gear pairs to transmit the rotary drive power, wherein the transmission is capable of shifting between adjacent two of the gear positions in response to switching the first and second clutches into and out of engagement when the shift drum is in a given angular position for a gear position. The controller performs a preliminary upshifting action in advance for angularly moving the shift drum to an angular position depending on a next gear position in an upshifting direction while rotary drive power from the crankshaft to the transmission is being maintained at a given gear position.

When an upshifting command is output, the controller engages the first clutch or the second clutch depending on the upshifting command, and when a downshifting command is output, the controller performs a preliminary downshifting action in advance for angularly moving the shift drum to an angular position depending on a next gear position in a downshifting direction based on the downshifting command, and when position detecting means for detecting an angular position of the shift drum detects a completion of the preliminary downshifting action, the controller engages the first clutch or the second clutch.

According to the first aspect, when the upshifting command is output by the controller, the first clutch or the second clutch is engaged simultaneously with the upshifting command. Therefore, the clutch is engaged at the earliest timing when the preliminary upshifting action can be started, and hence the upshifting time is shortened.

When a downshifting command is output, the preliminary downshifting action is carried out simultaneously with the downshifting command, and the first clutch or the second clutch is engaged in response to the detection by the (position detecting means) of the completion of the preliminary downshifting action. The clutch is thus engaged at the earliest timing when the first clutch or the second clutch can start being engaged, and hence the downshifting time is greatly shortened.

In a second aspect of the present invention, in addition to the first aspect, the invention is characterized in that the twin clutch assembly is actuated by hydraulic pressure, and the shift drum is actuated by an electric motor.

According to the second aspect, the twin clutch assembly is actuated by the hydraulic pressure, and the shift drum is actuated by the electric motor. Accordingly, the gear shifting can accurately be controlled quickly in a short period of time, making it possible to reliably achieved control targets such as a shortened gear shifting time, reduced gear shifting shocks, etc.

In a third aspect hereof, in addition to the first aspect, the present invention is characterized in that the first clutch selectively transmits rotary drive power of a gear pair in an odd-numbered gear position, and the second clutch selectively transmits rotary drive power of a gear pair in an even-numbered gear position.

According to the third aspect, said first clutch selectively transmits rotary drive power of the gear pair in the odd-numbered gear position, and said second clutch selectively transmits rotary drive power of the gear pair in the even-numbered gear position. Therefore, in combination with gear shifting operation of the transmission, the engaged states of the first clutch and the second clutch can successively be changed to upshifting gear positions successively. The gear shifting time can thus be shortened.

In a fourth aspect hereof, in addition to one of first through third aspect, the present invention is characterized in that a partially neutral position is provided between given angular positions of the shift drum for temporarily reducing the angular speed of the shift drum when the shift drum is angularly rotated.

According to the fourth aspect, the partly neutral position is provided between the given angular positions of said shift drum for temporarily reducing the angular speed of said shift drum when the shift drum is angularly rotated. Therefore, when the shift drum reaches an angular position depending on a next gear position, shocks produced when the shift drum abuts against a member for limiting the shift drum to the angular position are reduced, resulting in a reduction in gear shifting shocks.

A fifth aspect of the present invention provides an automatic transmission assembly for transmitting rotary power from a crankshaft to a drive train component. In this fifth embodiment, the automatic transmission assembly includes a main shaft operatively connected to the crankshaft; a an auxiliary shaft operatively connected to the main shaft; a transmission unit having a plurality of gear pairs for providing gear positions between the main shaft and the auxiliary shaft, a twin clutch assembly having first and second clutches disposed on one of the main shaft and the auxiliary shaft for selectively transmitting rotary drive power between the crankshaft and the transmission unit.

The automatic transmission assembly of the fifth aspect further includes a controller for changing the angular position of a shift drum for actuating a shift fork and the engagement and disengagement of the twin clutch assembly to selecting one of the gear pairs to transmit the rotary drive power.

The transmission unit according to the fifth aspect is capable of shifting between adjacent two of the gear positions in response to switching the first and second clutches into and out of engagement when the shift drum is in a given angular position for a gear position, a partly neutral position is provided between given angular positions of the shift drum for temporarily reducing the angular speed of the shift drum when the shift drum is angularly rotated, and the shift drum has a position angle sensor (also referred as position detecting means) detecting the given angular position and the partially neutral position.

According to the fifth aspect of the present invention, the partially neutral position is provided between the given angular positions of the shift drum for temporarily reducing the angular speed of the shift drum when the shift drum is angularly rotated, and the shift drum has a position angle sensor (position detecting means) for detecting the given angular positions and the partly neutral position.

Therefore, it is possible to perform various modes of shift drum actuation control corresponding to the partly neutral position, and the aim of shift drum actuation control for shortening a gear shifting time and reducing gear shifting shocks can reliably be achieved.

In a sixth aspect hereof, in addition to the fifth aspect, the invention is characterized in that when the shift drum stays in the partially neutral position for a predetermined (i.e., fixed) period of time, the controller angularly moves the shift drum to the given angular position corresponding to the gear position in an upshifting direction or a downshifting direction regardless of whether a power source coupled to the transmission is rotating or not, e.g., irrespective of rotation of the power source.

According to the sixth aspect, when the shift drum remains stuck in the partially neutral position for the fixed (e.g., predetermined) period of time, the controller angularly moves the shift drum to the given angular position corresponding to the gear position in the upshifting direction or the downshifting direction regardless of whether the power source coupled to the transmission is rotating or not. Therefore, the shift drum will not continuously stay in the partially neutral position, and appropriate shift drum actuation control can be carried out at all times.

In a seventh aspect hereof, in addition to the fifth aspect, the invention is characterized in that the shift drum is angularly rotated by an electric motor energized by an electric power supply of a power source coupled to the transmission, and if the electric power supply is turned off to stop the shift drum in the partly neutral position, the controller angularly moves the shift drum to the given angular position corresponding to the gear position in an upshifting direction or a downshifting direction when the electric power supply is turned on.

According to the seventh aspect of the invention, the shift drum is angularly rotated by the electric motor energized by the electric power supply of the power source coupled to the transmission, and when the electric power supply is turned off to stop the shift drum in the partly neutral position, the controller angularly moves the shift drum to the given angular position corresponding to the gear position in the upshifting direction or the downshifting direction when the electric power supply is turned on.

Therefore, even if the engine is shut off while the shift drum is in the partially neutral position and the electric power supply is disabled, the shift drum is in a clear position when the engine is stared again, allowing appropriate shift drum actuation control to be continued.

For a more complete understanding of the present invention, the reader is referred to the following detailed description section, which should be read in conjunction with the accompanying drawings.

BRIEF DESCRIPTION OF THE DRAWINGS

FIG. 16A is a view showing a movable contactor and a fixed contactor of the shift position sensor.

FIG. 16B is a cross-sectional view taken along line J-J of FIG. 16A.

FIG. 17A is a view showing a movable contactor and a fixed contactor of a shift position sensor according to another embodiment thereof.

FIG. 17B is a cross-sectional view taken along line K-K of FIG. 17A.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
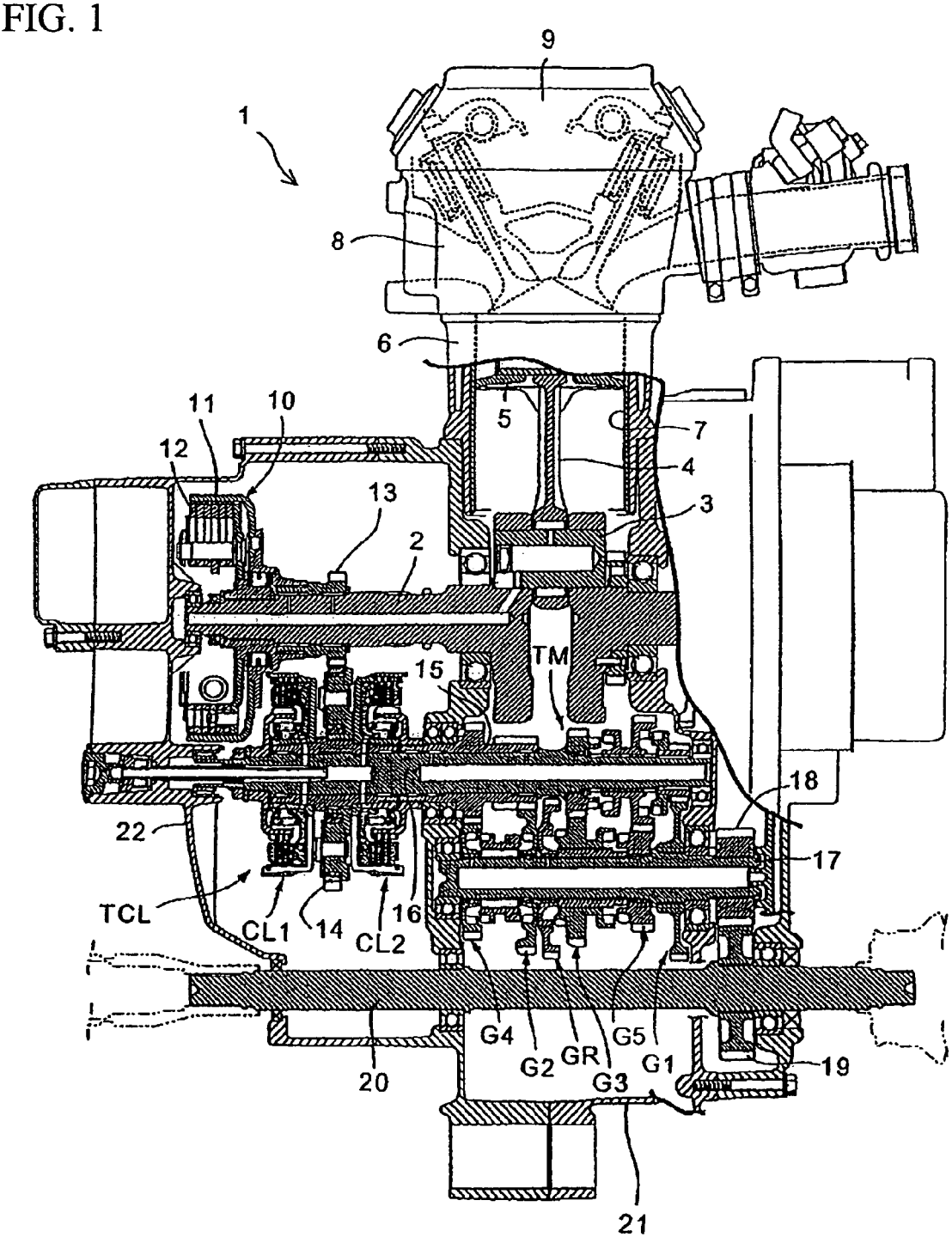
FIG. 1 is a cross-sectional view of a power unit an engine and an automatic transmission assembly according to an illustrative embodiment of the present invention.

Illustrative embodiments of the present invention are described in detail below with reference to the drawings. FIG. 1 is a cross-sectional view of an engine 1 to which an automatic transmission assembly according to an illustrative embodiment of the present invention is applied.

Figure 19:
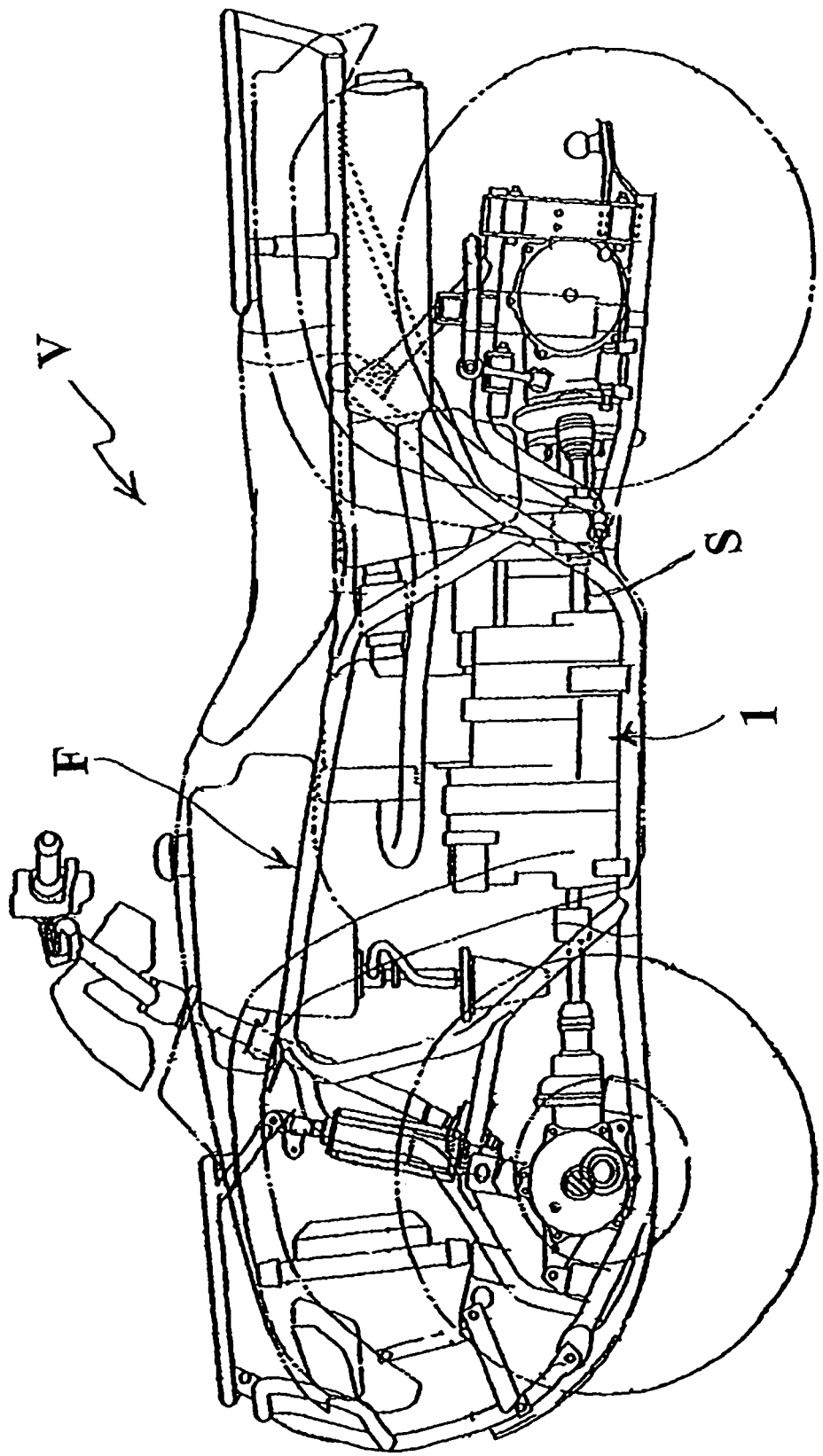
FIG. 19 is a side plan view of a vehicle (ATV) incorporating the automatic transmission assembly according to illustrative embodiments of the present invention.

The engine 1, used as a power source of a vehicle such as a riding-type four-wheeled vehicle (e.g., a car, a all-terrain vehicle), is a four-cycle single-cylinder internal combustion engine integrally combined with an automatic transmission assembly having an automatic transmission unit TM with five forward gear positions and a single reverse gear position. FIG. 19 shows a vehicle V (e.g. an ATV) incorporating the power unit 1 including combined with the automatic transmission assembly TM, as discussed below.

As shown in FIG. 19, the engine 1 according to an illustrative embodiment of the present invention is shown operatively mounted on a vehicle V, which may be a four-wheeled saddle-type vehicle, for example, an all-terrain vehicle (ATV). In the depicted example, the engine 1 is mounted in a central portion of the vehicle's frame F. The internal combustion engine 1 constitutes a power unit for the vehicle V, combining the basic engine components together in a single integrated power unit with the transmission system, including dual clutches and a transmission TM.

The power generated by the internal combustion engine 1 is transmitted from a crankshaft 2 of the internal combustion engine through the clutches and the transmission TM to a drive shaft S operatively connected to each of a plurality of drive wheels.

As shown in FIG. 1, the engine 1 includes a crankcase 21. The engine includes a crankshaft 2 rotatably supported in the crankcase 21, and a connecting rod 4 having an end rotatably supported on the crankshaft 2 by a crankpin 3. The engine 1 also includes a piston 5, which is mounted on the other end of the connecting rod 4 for sliding movement in a sleeve 7 mounted in a cylinder 6. The engine 1 further includes a cylinder head 8 housing a valve mechanism for controlling the intake and discharge of an air-fuel mixture and a combustion gas, and a cylinder head cover 9 fixedly mounted on the upper end of the cylinder 6.

A starter clutch 10, having a clutch outer member 11 and a clutch shoe 12, is mounted on the left end of the crankshaft 10. When the rotary speed of the engine, i.e., the rotary speed of the crankshaft 2, exceeds a predetermined value (e.g., 2,000 rpm), frictional forces are generated between the clutch outer member 11 rotatable in unison with the crankshaft 2 and the clutch shoe 12, thereby transmitting rotary drive power of the engine 1 to an output gear 13 fixed to the clutch outer member 11.

The rotary drive power transmitted from the crankshaft 2 to the output gear 13 is transmitted to an output shaft 20 through a primary gear 14, a twin clutch assembly TCL, an inner primary shaft 16 as a main shaft, an outer primary shaft 15 rotatably supported on the inner primary shaft 16, a countershaft 17 as an auxiliary shaft, a transmission unit TM including gears G1 through G5 and GR disposed between the primary shafts 15, 16, a drive output gear 18, and a driven output gear 19.

The twin clutch assembly TCL includes a first clutch CL1 and a second clutch CL2 disposed back to back with the primary gear 14, i.e., the primary gear 14 is interposed between the first clutch CL1 and a second clutch CL2. A plurality of hydraulic pressure passages for actuating clutches CL1, CL2 of the twin clutch assembly TCL are disposed in vicinity of a left case 22 of the crankcase 21.

Figure 2:
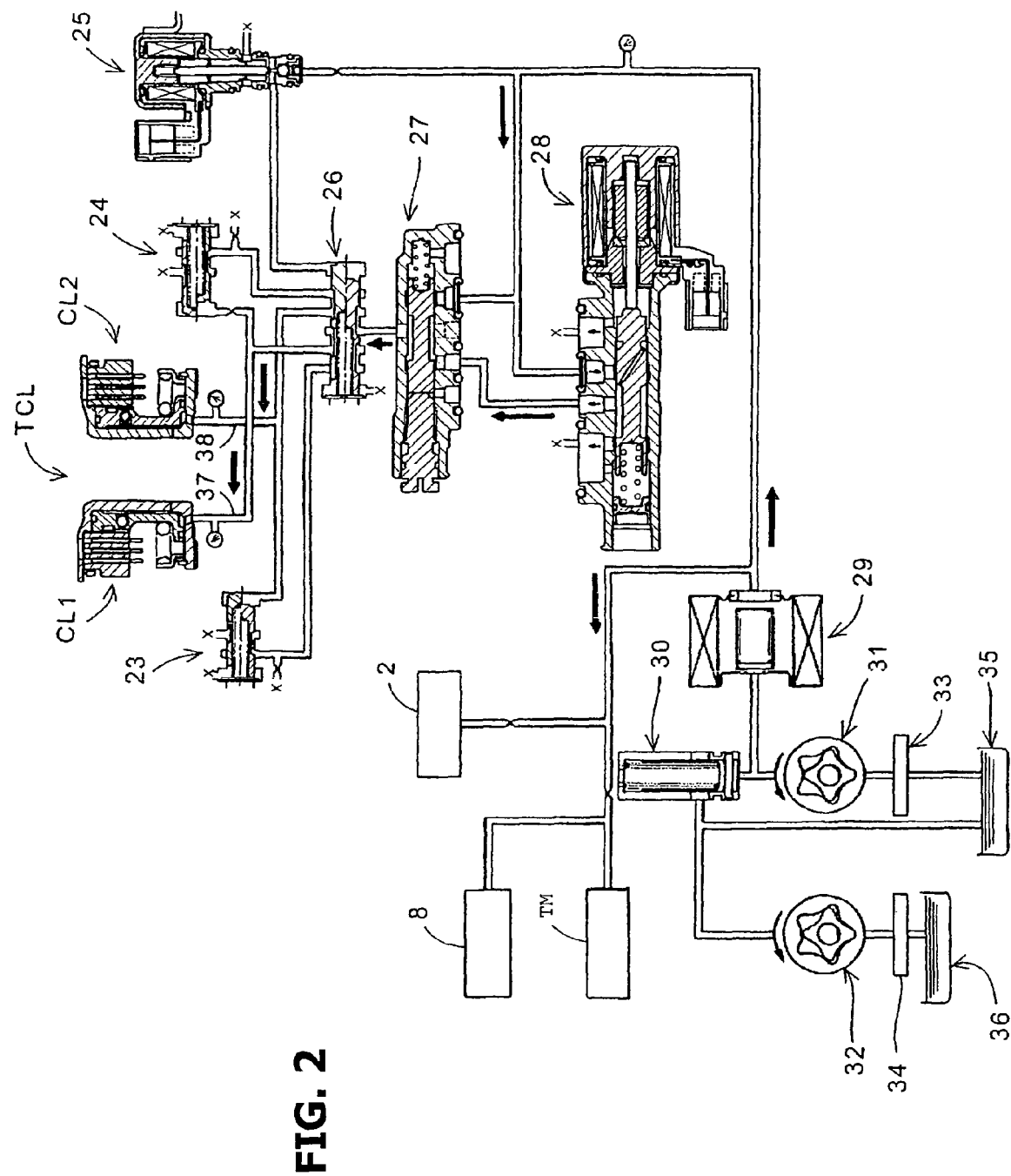
FIG. 2 is a block diagram showing a hydraulic passage system for actuating a twin clutch assembly of the automatic transmission assembly.

FIG. 2 is a block diagram showing a hydraulic passage system for actuating the twin clutch assembly TCL. A hydraulic pressure for actuating the first clutch CL1 and the second clutch CL2 is generated by a trochoidal feed pump 31 (also referred as a fist pump 31) which rotates upon rotation of the crankshaft 2. During the operation of the feed pump 31, oil drawn up from an oil tank 35 through an oil strainer 33 is supplied at a predetermined hydraulic pressure to lubricating passages of the crankshaft 2, the cylinder head 8, and the transmission unit TM via a relief valve 30 and an oil filter 29. In the present embodiment, the hydraulic passage system also includes a second pump 32 for drawing up oil from an oil pan 36 through an oil strainer 34.

A portion of oil at predetermined hydraulic pressure generated by the feed pump 31 is supplied to a clutch actuating hydraulic pressure structure including a linear solenoid valve 28, an emergency valve 27, a shift solenoid valve 25, a shift valve 26, orifice control valves 23, 24, the first clutch CL1, and the second clutch CL2. The hydraulic pressure structure allows the first clutch CL1 and the second clutch CL2 to selectively engage alternately when the solenoid of the shift solenoid valve 25 is turned on and off.

The linear solenoid valve 28 linearly changes the hydraulic pressure supplied therefrom for reducing shocks produced by transmission unit TM upon (or during) gear shifting. The hydraulic pressure supplied from the linear solenoid valve 28 is introduced through the emergency valve 27 into the shift valve 26.

In an event that the linear solenoid valve 28 is unable to supply the hydraulic pressure due to a failure thereof or the like, the emergency valve 27 may be manually operated to change hydraulic passages thereof to open a bypass circuit thereby supplying oil directly to the shift valve 26 bypassing the linear solenoid valve 28.

When the solenoid of the shift solenoid valve 25 is turned on, the shift solenoid valve 25 is opened for supplying working oil (at a predetermined pressure) to the shift valve 26 for changing hydraulic passages thereof. At this time, the shift valve 26 supplies the hydraulic pressure from the linear solenoid valve 28 to the first clutch CL1 for engagement thereof.

When the solenoid of the shift solenoid valve 25 is turned off, the shift solenoid valve 25 is closed. The shift valve 26 supplies the hydraulic pressure from the linear solenoid valve 28 to the second valve CL2 for engagement thereof. The orifice control valves 23, 24 are configured to allow an excessive hydraulic pressure surge to bleed from the hydraulic circuit after the first clutch CL1 or the second clutch Cl2 is engaged, thereby reducing gear shifting.

Figure 3:
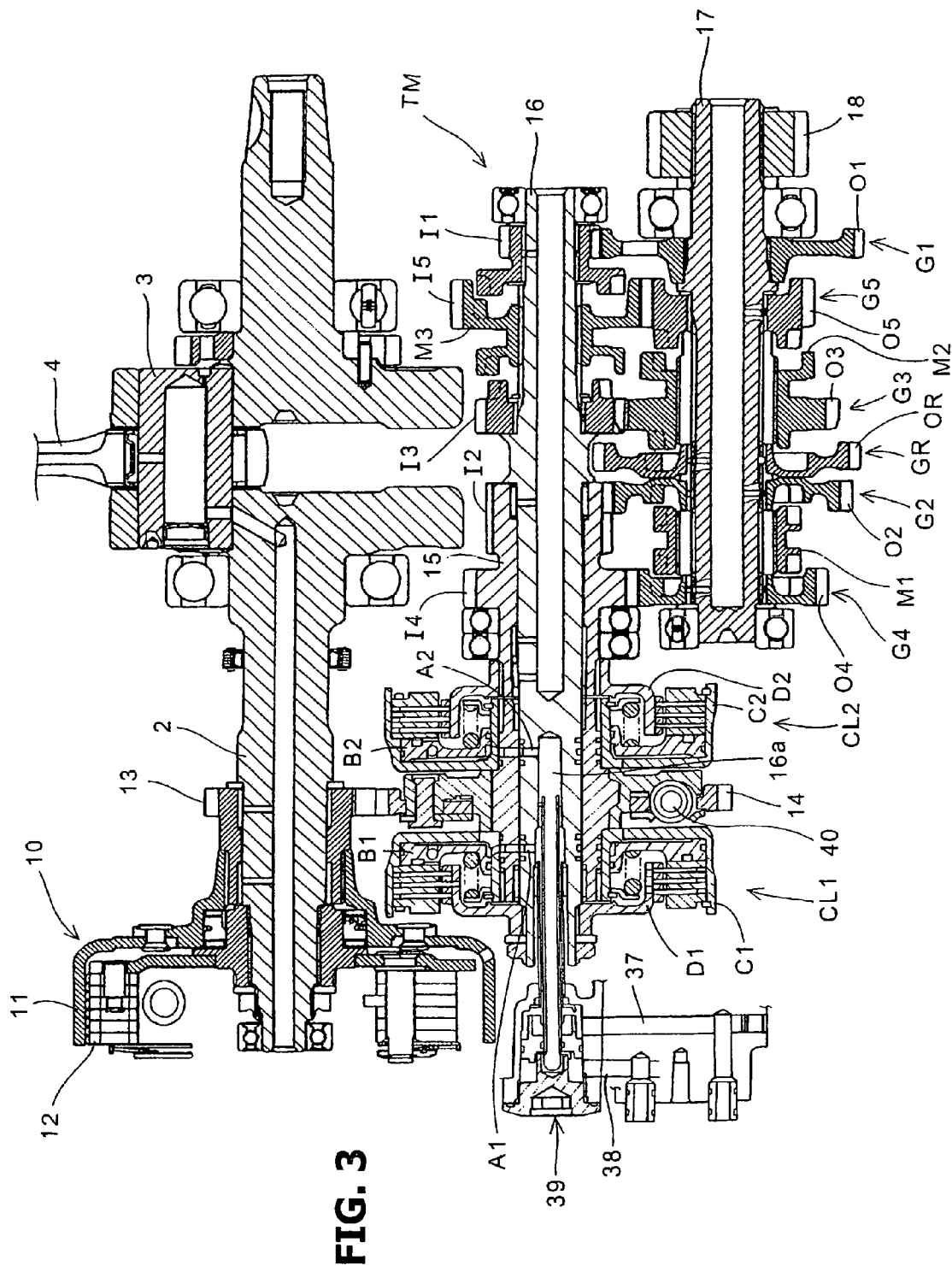
FIG. 3 is a fragmentary enlarged cross-sectional view of the automatic transmission assembly shown in FIG. 1.

FIG. 3 is a fragmentary enlarged cross-sectional view of the automatic transmission assembly shown in FIG. 1.

As shown in FIG. 3, the transmission unit TM includes a sequential multiple-gear-position automatic transmission with five forward gear positions and a single reverse gear position. The transmission unit TM shifts gears between the gear positions by turning on and off the hydraulic pressure applied to the twin clutch assembly TCL and by slidingly moving a first sleeve M1, a second sleeve M2, and a third sleeve M3 which, in combination, serve as part of a gear shifting mechanism.

The primary gear 14 is rotatably connected to the outer primary shaft 15 and the inner primary shaft 16. The primary drive gear incorporates therein a shock absorbing mechanism including a spring 40 for absorbing shocks generated when the drive power is transmitted from the crankshaft 2 to the output shaft 20.

In the present embodiment, the first clutch CL1 and the second clutch CL2 are substantially identical in structure since each of these clutches includes substantially identical combination of parts. However, these clutches CL1 and CL2 may not be formed substantially identical to each other.

The features of the first clutch CL1 are described below (the corresponding features (portions) of the second clutch CL2 are denoted by reference characters in parentheses).

As shown in FIG. 3, the first clutch CL1 includes a clutch case C1 (C2) fixed to the primary gear 14, and a piston B1 (B2) hermetically inserted in the clutch case C1 (C2) and mounted on the bottom thereof with an oil seal interposed therebetween. When working oil is supplied at a predetermined pressure from a hydraulic passage A1 (A2) defined in the inner primary shaft 16 to the clutch case C1 (C2), the piston B1 (B2) is pushed to the left (right), as shown in FIG. 3. When the pressure of the working oil is lowered, the piston B1 (B2) is rotated back to its original position under the resiliency of a spring.

On the left (right) side of the piston B1 (B2) in FIG. 3, the first clutch CL1 (the second clutch CL2) also includes a clutch plate assembly including three friction disks non-rotatably engaging the clutch case C1 (C2) and three clutch plates non-rotatably engaging an arm D1 (D2) and alternating with the friction disks. When the piston B1 (B2) is pushed to the left (right), frictional forces are developed between the friction disks and the clutch plates. Unless the piston B1 (B2) is pushed under the hydraulic pressure, the rotary drive power from the primary gear 14 rotates only the clutch case C1 (C2) and not the arms D1 (D2).

When the piston B1 (B2) is pushed under the hydraulic pressure, the rotary drive power from the primary gear 14 rotates both the clutch case C1 (C2) and the arm D1 (D2). At this time, the linear solenoid valve 28 may control the hydraulic pressure to cause the first clutch CL1 (the second clutch CL2) to engage partially.

The hydraulic passage system further includes a hydraulic passage distributor 39 in a form of a double-walled pipe inserted in an oil gallery 16a formed axially in the inner primary shaft 16. The hydraulic pressure supplied to a supply hydraulic passage 37 acts through an outer pipe passageway of the hydraulic passage distributor 39 and the hydraulic passage A1 to actuate the piston B1 of the first clutch CL1. The hydraulic pressure supplied to a supply hydraulic passage 38 acts through a space between the outer and inner pipe passageways of the hydraulic passage distributor 39 and the hydraulic passage A2 to actuate the piston B2 of the second clutch CL2.

As shown in FIG. 3, the arm D1 of the first clutch CL1 is fixed to the left end of the inner primary shaft 16, and the arm D2 of the second clutch CL2 is fixed to the outer primary shaft 15.

The transmission unit TM includes a plurality of drive gears, sleeves and driven gears. A first-gear-position drive gear I1 and a third-gear-position drive gear I3 are axially nonslidably, and circumferentially rotatably mounted on the inner primary shaft 16. A third sleeve M3 with a fifth-gear-position drive gear I5 is axially slidably, and circumferentially nonrotatably mounted on the inner primary shaft 16 between the first-gear-position drive gear I1 and the third-gear-position drive gear I3. A second-gear-position drive gear I2 and a fourth-gear-position drive gear I4 are integrally formed with the outer primary shaft 15.

The countershaft 17 supports thereon a first sleeve M1 which is axially slidable and circumferentially nonrotatable, a first-gear-position driven gear O1 which is axially nonslidable and circumferentially nonrotatable, a second-gear-position driven gear O2 which is axially nonslidable and circumferentially rotatable, a second sleeve M2 with a third-gearposition driven gear O3 which is axially slidable and circumferentially nonrotatable, a fourth-gear-position driven gear O4 which is axially nonslidable and circumferentially rotatable, and a fifth-gear position drive gear O5 which is axially nonslidable and circumferentially rotatable.

The first, second, and third sleeves M1 through M3 are axially slidable to engage and disengage dog clutches that are made up of those sleeves and adjacent gears. The transmission unit TM is capable of transmitting the rotary drive power from the crankshaft 2 to the counter shaft 17 through gear pairs that are selectively established by a combination of engaged states of the first and second clutches CL1, CL2 and axial positions of the first, second, and third sleeves M1 through M3. A reverse gear OR rotatably supported on the countershaft 17 is held in mesh with a reverse output gear (not shown) at all times, providing a gear pair GR.

The first clutch CL1 selectively transmits the rotary drive power in odd-numbered gear positions, i.e., a first gear position, a third gear position, and a fifth gear position, and the second clutch CL2 selectively transmits the rotary drive power in even-numbered gear positions, i.e., a second gear position and a fourth gear position, and a reverse gear position.

When the transmission unit TM operates to upshift from the first gear position successively to higher gear positions, for example, the first clutch CL1 and the second clutch CL2 are selectively engaged alternately.

Figure 4:
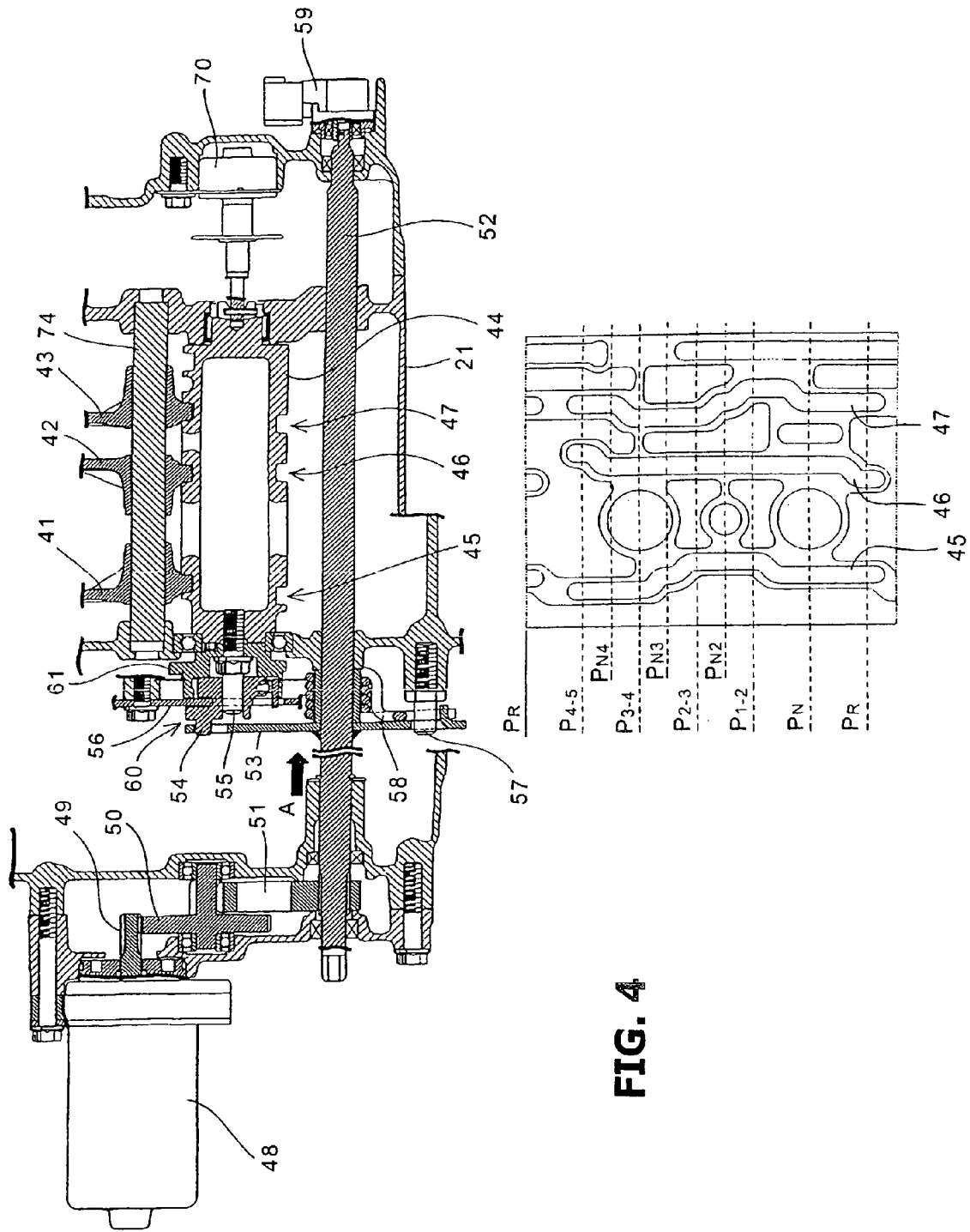
FIG. 4 is a cross-sectional view of a gear shifting mechanism of a transmission unit and a development plan of a shift drum of the transmission unit.

FIG. 4 is a cross-sectional view of the gear shifting mechanism of the transmission unit TM, together with a development plan of a shift drum 44. The shift drum 44 in the form of a hollow cylinder is rotatably supported in the crankcase 21 in the vicinity of the transmission unit TM. The shift drum 44 axially extends parallel to the axial direction of the transmission unit TM.

As shown in FIG. 4, the shift drum 44 has a plurality of lead grooves 45, 46, 47 formed in an outer circumferential surface thereof and receiving therein the respective lower ends of shift forks 41, 42, 43. The shift forks 41, 42, 43 are axially slidably mounted on a fork rod 74 extending parallel to the shift drum 44. When the shift drum 44 is angularly rotated about its own axis, it causes the shift forks 41, 42, 43 to axially move the first, second, and third sleeves M1 through M3 which are engaged by the respective other ends of the shift forks 41, 42, 43.

Generally, transmission shift drums are angularly movable to angular positions that are held in one-to-one correspondence to the gear positions. According to the present embodiment, however, the shift drum 44 is angularly movable to its own unique angular positions that are established in combination with the twin clutch assembly TCL.

As shown in the development plan (shown in a lower portion of FIG. 4), the shift drum 44 is angularly movable to an angular position $P_R$ corresponding to the reverse gear position, an angular position $P_N$ corresponding to a neutral gear position, an angular position $P_{1-2}$ corresponding to the first and second gear positions, an angular position $P_{2-3}$ corresponding to the second and third gear positions, an angular position $P_{3-4}$ corresponding to the third and fourth gear positions, and an angular position $P_{4-5}$ corresponding to the third and fourth gear positions.

For example, when the shift drum 44 is in the angular position $P_{1-2}$, the transmission unit TM can shift gears between the first gear position and the second gear position simply by changing engaged states of the first clutch CL1 and the second clutch CL2.

According to the present invention, partially neutral positions $P_{N2}, P_{N3}, P_{N4}$ are established intermediate between certain angular positions of the shift drum 44. When the shift drum 44 is angularly rotated in an upshifting direction from the angular position $P_{1-2}$ to the angular position $P_{2-3}$, for example, the shift drum 44 goes through the partially neutral position $P_{N2}$. At this time, the angular speed of the shift drum 44 is temporarily lowered to reduce shocks which the transmission unit TM produces upon gear shifting and also to allow the transmission unit TM to make a reliable gear shift.

The automatic transmission assembly of the present invention a controller 100. The shift drum 44 is angularly rotated by an electric motor 48 which serves as an actuator controlled by the controller 100, as discussed herein below.

The rotary drive power from the electric motor 48 is transmitted from an output shaft 49 thereof through an intermediate gear 50 and a sectorial gear 51 to a shift spindle 52 on which a planar shift arm 53 is mounted. When the shift arm 53 reciprocates back and forth in one cycle through a given angle, it causes a pawl ratchet mechanism 60 to angularly move the shift drum 44 in one direction through a certain angle.

A drum center 61 nonrotatably is secured to an end of the shift drum 44 by a central bolt 55. The drum center 61 moderates the movement of the shift drum 44 to switch between the angular positions and the partially (partly) neutral positions. The pawl ratchet mechanism 60 is rotatably held by a guide plate 56 and a shifter assembly 54 that are fixed to the crankcase 21. The shifter assembly 54 has an end received in an engagement hole formed in the shift arm 53.

As shown in FIG. 4, a return spring 58 engages the shift spindle 52 and a guide pin 57 for normally urging the shift arm 53 to return to its initial position. A shift position sensor 70 (also referred as a position detecting means 70) detects a present gear position based on the angular position of the shift drum 44. The shift position sensor 70 is connected to the right end of the shift drum 44. An angle sensor 59 is connected to the right end of the shift spindle 52.

Figure 5:
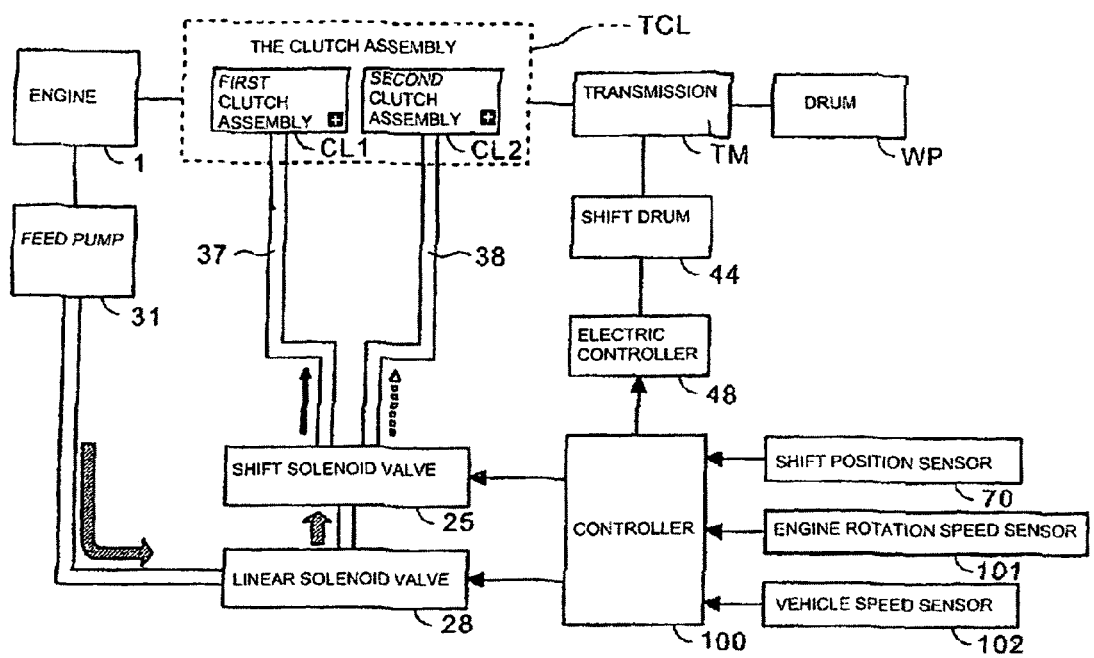
FIG. 5 is a block diagram of the automatic transmission assembly according to the present embodiment.

FIG. 5 is a block diagram of the automatic transmission assembly according to the illustrative embodiment. The automatic transmission assembly includes the controller 100 for controlling the shift solenoid valve 25, the linear solenoid valve 28, and the electric motor 48 to enable the transmission unit TM to function as an automatic transmission or a semi-automatic transmission which operates in response to gear position commands from the vehicle driver using switches.

The rotary drive power of the engine 1 is transmitted to a drive wheel WP of the vehicle at a speed reduction ratio corresponding to a selected gear position of the transmission unit TM. The controller 100 is supplied with signals from the shift position sensor 70, an engine rotary speed sensor 101, and a vehicle speed sensor 102, for performing various modes of control to change the timings and rates at which the twin clutch assembly TCL is engaged and disengaged and also to change the timings and rates at which the shift drum 44 is angularly rotated.

Figure 6:
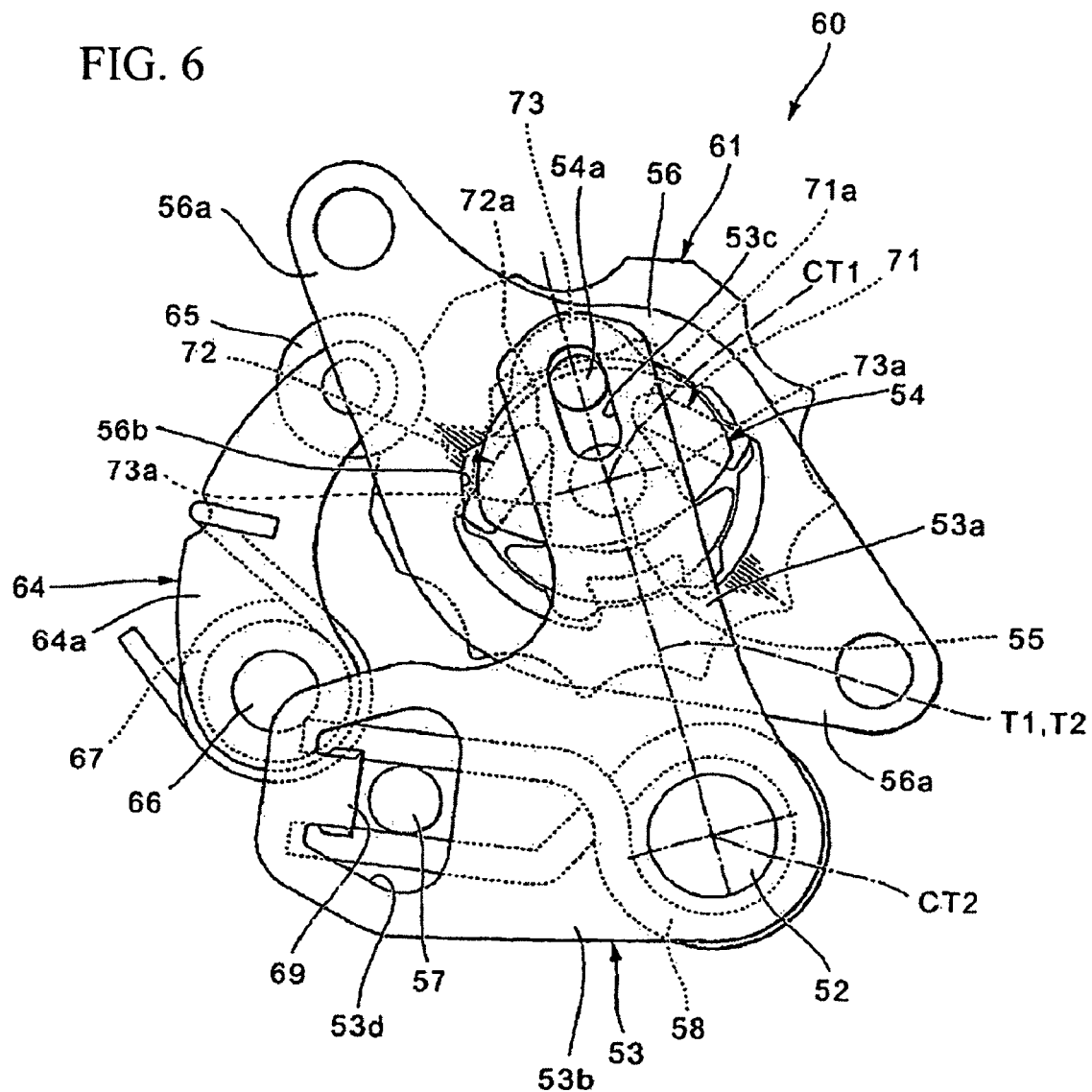
FIG. 6 is an illustrative view of operation of the gear shifting mechanism as viewed in the direction indicated by an arrow A in FIG. 4.
Figure 7:
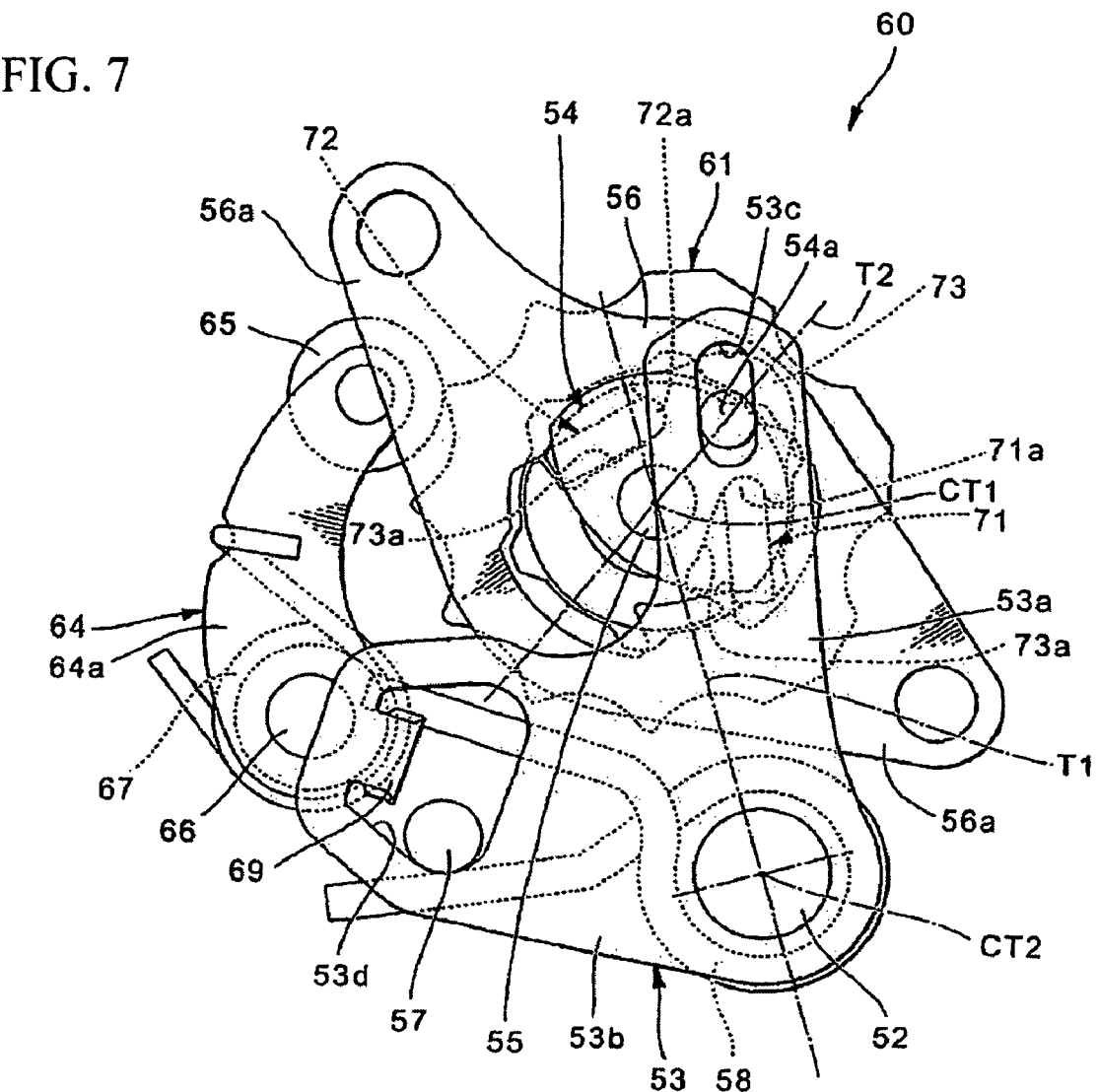
FIG. 7 is another illustrative view of operation of the gear shifting mechanism as viewed in the direction indicated by the arrow A in FIG. 4.

FIGS. 6 and 7 show the manner in which the gear shifting mechanism operates as viewed in the direction indicated by an arrow A in FIG. 4.

FIG. 6 shows the gear shifting mechanism when the electric motor 48 is not energized, i.e., when the shift arm 53 is in its initial position. FIG. 7 shows the gear shifting mechanism when the electric motor 48 is energized with the shift arm 53 being angularly rotated a predetermined angle clockwise about the rotary axis CT2 of the shift spindle 52.

In the present embodiment, the clockwise direction is referred to as an upshifting direction, and the predetermined angle is set to 60 degrees. The pawl ratchet mechanism 60 angularly moves the shift drum 44 through successive given angles. The pawl ratchet mechanism 60 includes the drum center 61 coaxially and rotatably mounted on one of the ends of the shift drum 44, the shifter assembly 54 disposed in a recess defined in the drum center 61, and the guide plate 56 having an insertion hole 56b defined therein with the shifter assembly 54 disposed therein.

The shift drum 44 and the drum center 61 are nonrotatably fastened to each other by the central bolt 55. The shifter assembly 54 is rotatably supported by a support shaft mounted on the head of the central bolt 55. In FIGS. 6 and 7, the axial center of the support shaft is indicated as a rotary axis CT1.

The shift arm 53 includes a main arm 53a and a guide arm 53b extending substantially to the left at a right angle to the main arm 53a. The guide arm 53b has a guide hole 53d defined in a distal end portion thereof. The guide hole 53d has a certain width along the directions in which the shift arm 53 is angularly movable. The guide pin 57 is inserted in the guide hole 53d. The initial position of the shift arm 53 refers to a position in which the guide pin 57 is positioned centrally in the guide hole 53d with respect to the directions in which the shift arm 53 is angularly movable.

The angles through which the shift arm 53 can be angularly rotated from its initial position in the respective opposite directions are defined when the guide pin 57 abuts against opposite inner surfaces of the guide hole 53d. An engaging tongue 69 projects from an inner surface of the guide hole 53d to the right and is engaged by acting ends of the return spring 58 disposed adjacent to the shift arm 53.

The return spring 58 includes a helical torsion spring through which the shift spindle 52 extends. The opposite ends, i.e., the acting ends, of the return spring 58 extend from the helical end thereof to the left and are disposed above and below the engaging tongue 69 and the guide pin 57. When the shift arm 53 is angularly rotated in one of the opposite directions from the initial position, the engaging tongue 69 and the guide pin 57 move relatively to each other, displacing one of the opposite ends of the return spring 58 away from the other end to exert a biasing force to return the shift arm 53 to the initial position.

In the present embodiment, the rotary axis CT1 and the rotary axis CT2 are interconnected by a central straight line T1, and the rotary axis CT1 and the center of an engaging pin 54a on the outer end of the shifter assembly 54 are interconnected by a shifter central straight line T2. The position where the central straight line T1 and the shifter central straight line T2 are aligned with each other is referred as an initial angular position of the shifter assembly 54. When the shifter assembly 54 is in the initial angular position, the shift arm 53 is also in its initial position referred, as discussed above.

The engaging pin 54a on the end of the shifter assembly 54 is disposed at a position offset from the rotary axis CT1 and extends through an oblong hole 53c defined in the main arm 53a of the shift arm 53. The rotary power of the shift spindle 52 is applied from the shift arm 53 through the engaging pin 54a to the pawl ratchet mechanism 60. When the shift arm 53 is in its initial position, the shift drum 44 is in an angular position corresponding to a certain gear position. At this time, the shift drum 44 is limited against angular movement by a drum stopper 64 that is held against the drum center 61.

The drum stopper 64 includes a stopper arm 64a angularly movably supported on a pivot shaft 66a fixed to the crankcase 2, a stopper roller 65 rotatably supported on a distal end of the stopper arm 64a, and a helical torsion spring 67 for normally urging the stopper arm 64a to press the stopper roller 65 against the outer circumferential surface of the drum center 61.

The drum center 61 has a plurality of arcuate recesses defined in the outer circumferential edge thereof at given angular intervals. Each of the recesses is shaped partly complementarily to the outer circumferential shape of the stopper roller 65. The drum center 61 and the drum stopper 64 cooperate with each other for applying a rotation resisting force to the shift drum 44.

The shifter assembly 54 includes a main shifter 73 disposed coaxially with and rotatable with respect to the drum center 61, and a pair of ratchet pawls 71, 72 assembled on the main shifter 73. The ratchet pawls 71, 72 are mounted on the main shifter 73 for swinging movement about their upper ends 71a, 72a, respectively. The ratchet pawls 71, 72 are normally urged toward an inner wall surface of a recess formed in the drum center 61 by an urging member (not shown).

The pawl ratchet mechanism 60 causes the shift drum 44 to be angularly rotated in one direction when the shifter assembly 54 is angularly rotated in one direction. After the shift drum 44 has been angularly rotated, the pawl ratchet mechanism 60 cooperates with the guide plate 56 allowing only the shifter assembly 54 to be angularly rotated idly in the opposite direction. Therefore, after the shift drum 44 has been angularly rotated in one direction, only the shifter assembly 54 can return to the initial position with respect to the drum center 61 and the shift drum 44 which have been limited against angular movement by the drum stopper 64.

When the shifter assembly 54 reciprocates back and forth in repeated cycles through the given angle, the drum center 61 and the shift drum 44 are intermittently angularly rotated in the opposite directions. The angle through which the shift drum 44 is angularly rotated in each intermittent cycle corresponds to the angle through which the transmission unit TM is upshifted or downshifted one gear position.

Figures 8, 9:
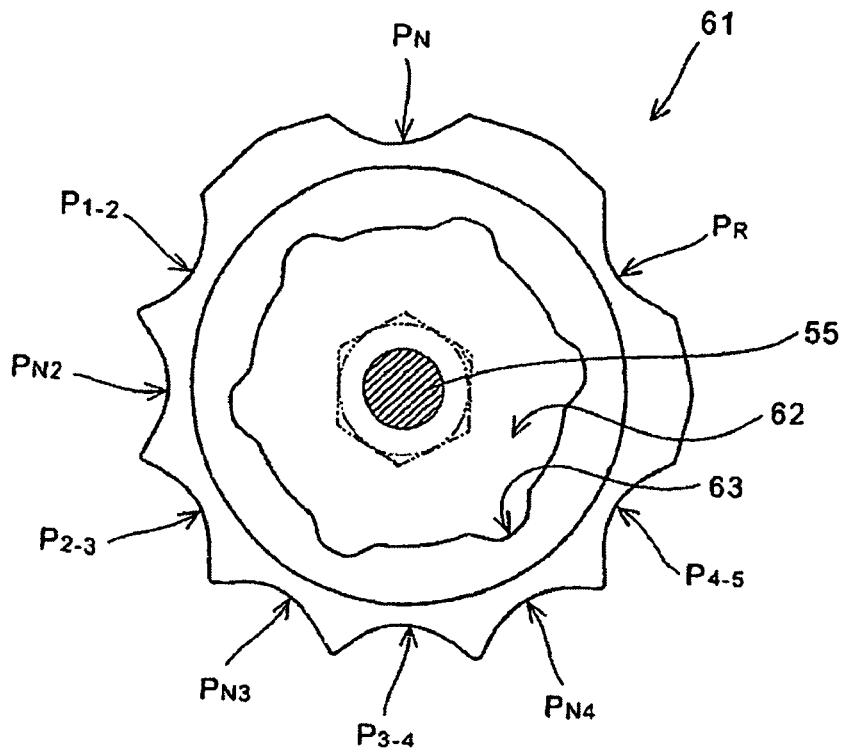
FIG. 8 is a front elevational view of a drum center (a shift drum center).
FIG. 9 is a table showing relationship between operation of a twin clutch assembly and the angular positions of the shift drum.

FIG. 8 is a front elevational view of the drum center 61. The drum center 61 has a recess 62 formed in one end face thereof. The shifter assembly 54 is disposed in the recess 62. The recess 62 includes six engaging recesses 63 (also referred as sub-recesses 63) formed in a circumferential edge thereof at equal angular intervals. The ratchet pawls 71, 72 have ends, remote from the ends 71a, 72a, engageable in the engaging sub-recesses 63. The arcuate recesses defined in the outer circumferential edge of the drum center 61 for receiving the stopper roller 65 of the drum stopper 64 are aligned with the angular positions $P_R$, $P_N$, $P_{1-2}$, $P_{2-3}$, $P_{3-4}$, $P_{4-5}$ and the partially neutral positions $P_{N2}$, $P_{N3}$, $P_{N4}$, respectively, of the shift drum 44.

FIG. 9 is a table showing the relationship between operation of the twin clutch assembly TCL and the angular positions of the shift drum 44. The first clutch CL1 of the twin clutch assembly TCL is engaged for transmitting the rotary drive power in the first, third, and fifth gear positions, and the second clutch CL2 thereof is engaged for transmitting the rotary drive power in the reverse gear position, the neutral gear position, and the second and fourth gear positions. In the table shown in FIG. 9, the statuses of the transmission unit TM where the first clutch CL1 and the second clutch CL2 are engaged in those positions are marked with symbol ○, i.e., circled.

When the transmission unit TM is in the neutral gear position, since no rotary drive power is transmitted in the transmission unit TM, the clutch may not be engaged. Operation of the automatic transmission at the time the shift drum 44 is in the angular position $P_{2-3}$ and the solenoid of the shift solenoid valve 25 is turned off (the second clutch CL2 is engaged) to transmit the rotary drive power in the second gear position is described below.

For upshifting to the third gear position while the vehicle is running in the second gear position (corresponding to 2H in FIG. 9), the controller 100 outputs an upshifting command to turn on the solenoid of the shift solenoid valve 25. The first clutch CL1 is engaged and the second clutch CL2 is disengaged, whereupon the gear shifting is completed. Immediately after the transmission unit TM is upshifted from the second gear position to the third gear position, therefore, the shift drum 44 is in the angular position $P_{2-3}$.

For upshifting from the third gear position to the fourth gear position, if the shift drum 44 remains in the angular position $P_{2-3}$, then the shift drum 44 needs to be angularly rotated to the angular position $P_{3-4}$ for upshifting, resulting in a corresponding additional time needed for gear shifting.

Preliminary Upshifting Action and Upshifting

In order to reduce the gear shifting time, while the rotary drive power is being transmitted from the crankshaft 2 to the transmission unit TM in a certain gear position, the shift drum 44 is angularly rotated in advance to an angular position corresponding to a next gear position into which to upshift the transmission unit TM. Such an operation is referred to as a preliminary upshifting action.

The preliminary upshifting action is a process in which after the transmission unit TM has completed upshifting from the second gear position to the third gear position, the shift drum 44 is angularly rotated in advance to an angular position corresponding to a next gear position into which to upshift the transmission unit TM in preparation for upshifting to the fourth gear position.

In the above example, the preliminary upshifting action corresponds to angularly moving the shift drum 44 from the angular position $P_{2-3}$ to the angular position $P_{3-4}$ while the vehicle is running in the third gear position. With the preliminary upshifting action being thus carried out, when the controller 100 outputs an upshifting command for the fourth gear position, the second clutch CL2 is engaged and the first clutch CL1 is disengaged, completing the upshifting process, simply by turning off the solenoid of the shift solenoid valve 25 simultaneously with the upshifting command. Accordingly, the gear shifting time is greatly reduced.

In the present embodiment, the partially neutral positions are provided between the certain angular positions of the shift drum 44. When the shift drum 44 goes through the partly neutral positions, the angular speed of the shift drum 44 is temporarily lowered to allow the transmission unit TM to make a reliable gear shift and also to reduce shocks which the transmission unit TM produces upon (or during) gear shifting.

According to the table shown in FIG. 9, while the vehicle is running in the second gear position, the shift drum 44 is in the angular position $P_{2-3}$, the solenoid of the shift solenoid valve 25 is turned off, and the status of the transmission unit TM is "2H" (a higher side of the second gear position). When the transmission unit TM is upshifted to the third gear position, the status of the transmission unit TM is changed to "3L" (a lower side of the third gear position). When the preliminary upshifting action is subsequently carried out, the status of the transmission unit TM is changed from 3L corresponding to the angular position $P_{3-4}$ to "3" corresponding to the partly neutral position $P_{N3}$, and then to "3H".

The preliminary upshifting action is also carried when the transmission unit TM is upshifted from the first gear position to the second gear position ($P_{1-2} \rightarrow P_{2-3}$) and also from the third gear position to the fourth gear position ($P_{3-4} \rightarrow P_{4-5}$).

Figure 10:
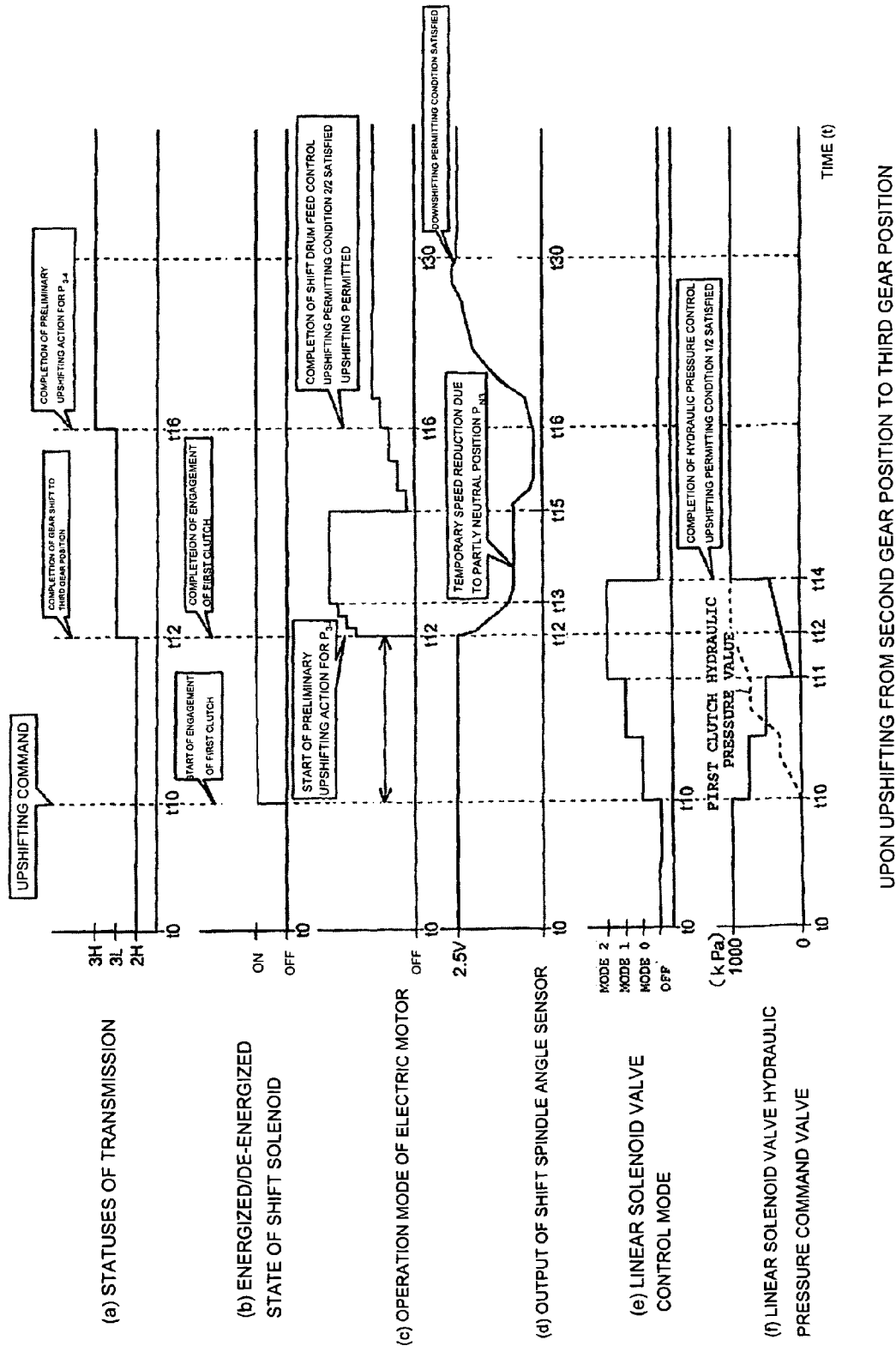
FIG. 10 shows timing charts ((a) through (f)) showing the operational states of various components in a preliminary upshifting action.

FIG. 10 shows timing charts ((a) through (f)) showing the operational states of various components in a preliminary upshifting action that is carried out when the transmission unit TM is upshifted from the second gear position to the third gear position. Specifically, the timing charts: (a) shows the statuses of the transmission unit TM, (b) shows the energized/de-energized state of the solenoid of the shift solenoid valve 25, (c) shows the operation mode of the electric motor 48, (d) shows the output of the angle sensor 59 connected to the shift spindle 52, (e) shows the control modes for the liner solenoid valve 28, and (f) shows the command value for the hydraulic pressure supplied to the linear solenoid valve 28.

The statuses of the transmission unit TM are detected based on an output signal from the shift position sensor 70 connected to the shift drum 44. As described above, when the automatic transmission according to the present embodiment is upshifted to the third gear position while the vehicle is running in the second gear position, since the preliminary upshifting action has been carried out to turn the shift drum 44 from the angular position $P_{1-2}$ to the angular position $P_{2-3}$, the gear shifting is completed in a very short period of time.

When an upshifting command is received at time t10, the solenoid of the shift solenoid valve 25 is simultaneously turned on. At the same time the solenoid of the shift solenoid valve 25 is energized, the linear solenoid valve 28 starts being actuated to increase the hydraulic pressure supplied to the first clutch CL1. When the hydraulic pressure supplied to the first clutch CL1 reaches a predetermined value (e.g., 1,000 kPa) at time t12, the first clutch CL1 is completely engaged, completing an upshift from the second gear position to the third gear position.

At the same time, when the transmission unit TM has completed the upshift at time t12, the preliminary upshifting action starts to turn the shift drum 44 from the angular position $P_{2-3}$ to the angular position $P_{3-4}$. When the preliminary upshifting action starts, the electric motor 48 is energized, and the output signal from the angle sensor 59 (see FIG. 4) connected to the shift spindle 52 changes. The angular position of the shift drum 44 becomes substantially partially (also referred as partly) neutral position $P_{N3}$ at time t13.

As indicated by the output signal from the angle sensor 59, the angular speed of the shift drum 44 temporarily decreases. The linear solenoid valve 28 is controlled in a mode 2 from time t11 to time t14 to adjust the supplied hydraulic pressure for minimizing gear shifting shocks as a hydraulic pressure command applied to the linear solenoid valve 28 is gradually incremented every 5 ms. When the hydraulic pressure command applied to the linear solenoid valve 28 returns to the initial level prior to the gear shift at time t14, the hydraulic pressure control required for a next upshift is completed, and a first upshifting permitting condition 1/2 is satisfied, as shown in the timing chart (e) of FIG. 10.

At time t15, the shift drum 44 is angularly rotated beyond the partially neutral position $P_{N3}$. At time t16, the shift drum 44 reaches the angular position $P_{3-4}$, whereupon the preliminary upshifting action is completed. At this time, the control to feed the shift drum 44 is completed, and a second upshifting permitting condition 2/2 is satisfied, as shown in the timing chart (c) of FIG. 10.

The transmission unit TM can now be upshifted to the fourth gear position simply by switching operation of the twin clutch assembly TCL. From time t16, the electric motor 48 is reversed in order to return the main shifter 73 (see FIG. 6) to its initial position. The operation of the electric motor 48 to return the main shifter 73 is completed at time t30. In the operation mode of the electric motor 48, when the main shifter 73 is returned, a three-stage feedback control process is performed on the electric motor 48 depending on the output signal from the angle sensor 59 for returning the shift spindle 52 accurately to its initial position.

With the automatic transmission according to the present embodiment, as described above, since the preliminary upshifting action starts and being performed at the same time that the engagement of the first clutch CL1 is completed, the control of the transmission unit TM starts at the same time the preliminary upshifting action can start. Consequently, the gear shifting time for upshifting is shortened.

The time from the start of engagement of the first clutch CL1 to the start of the preliminary upshifting action may be set by a timer, and the time set by the timer may be changed depending on the temperature of the oil in the engine. The above preliminary upshifting action can also be performed for upshifting from the first gear position to the second gear position and also for upshifting from the second gear position to the third gear position.

Figure 11:
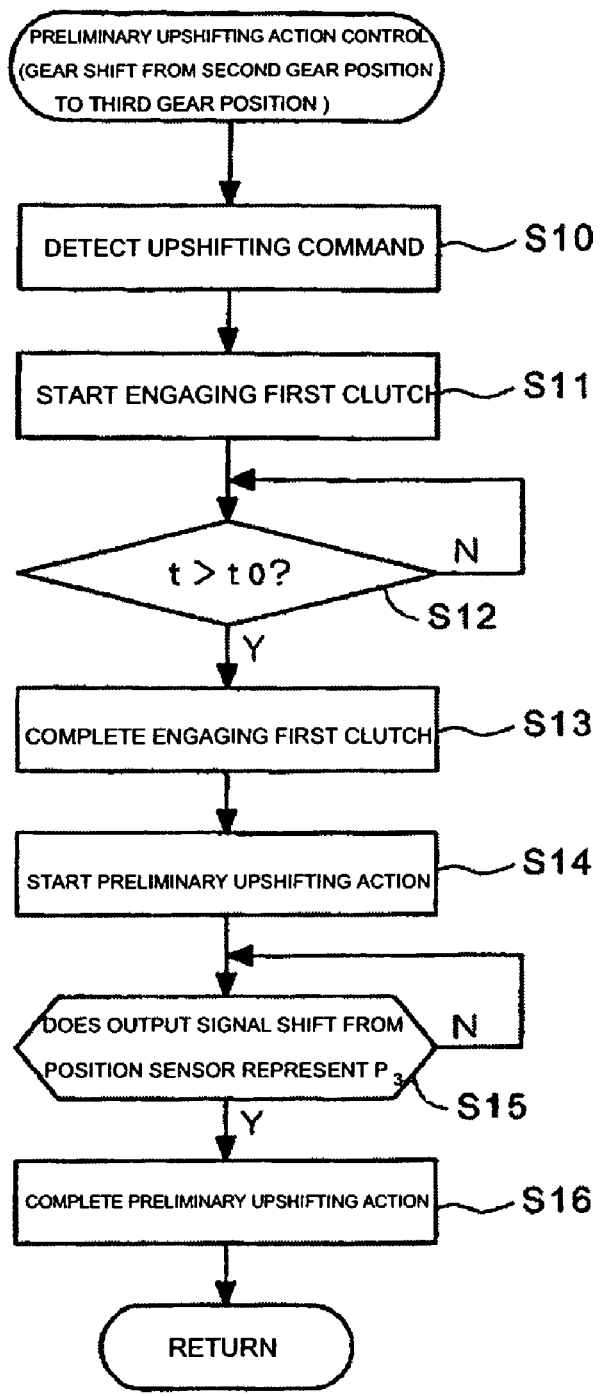
FIG. 11 is a flowchart showing a control flow of a preliminary upshifting action.

FIG. 11 is a flowchart of a control sequence of the preliminary upshifting action for upshifting from the second gear position to the third gear position. Steps in the flowchart shown in FIG. 11 correspond to those in the timing charts (a)-(f) shown in FIG. 10.

As shown in FIG. 11, in step S10, the upshifting command is detected (time t10). Control then goes to step S11 in which the first clutch CL1 starts being engaged (time t10). In step S12, it is determined whether the period of time t measured by a timer, which has elapsed from the start of engagement of the first clutch CL1, has exceeded a given time to or not. If it is judged in step S12 that the period of time t has exceeded the given time t0, then control goes to step S13 in which the engagement of the first clutch CL1 is completed, and the upshift from the second gear position to the third gear position is completed (time t12).

In step S14, the preliminary upshifting action starts to turn the shift drum 44 from the angular position $P_{2-3}$ to the angular position $P_{3-4}$ (time t12). In step S15, it is determined whether an output signal from the shift position sensor 70 is of a value corresponding to the angular position $P_{3-4}$ or not. If it is judged in step S15 that the output signal from the shift position sensor 70 is of a value corresponding to the angular position $P_{3-4}$, then control goes to step S16 in which the preliminary upshifting action is completed (time t16). The control sequence shown in FIG. 11 is now put to an end.

Preliminary Downshifting Action and Downshifting

Figure 12:
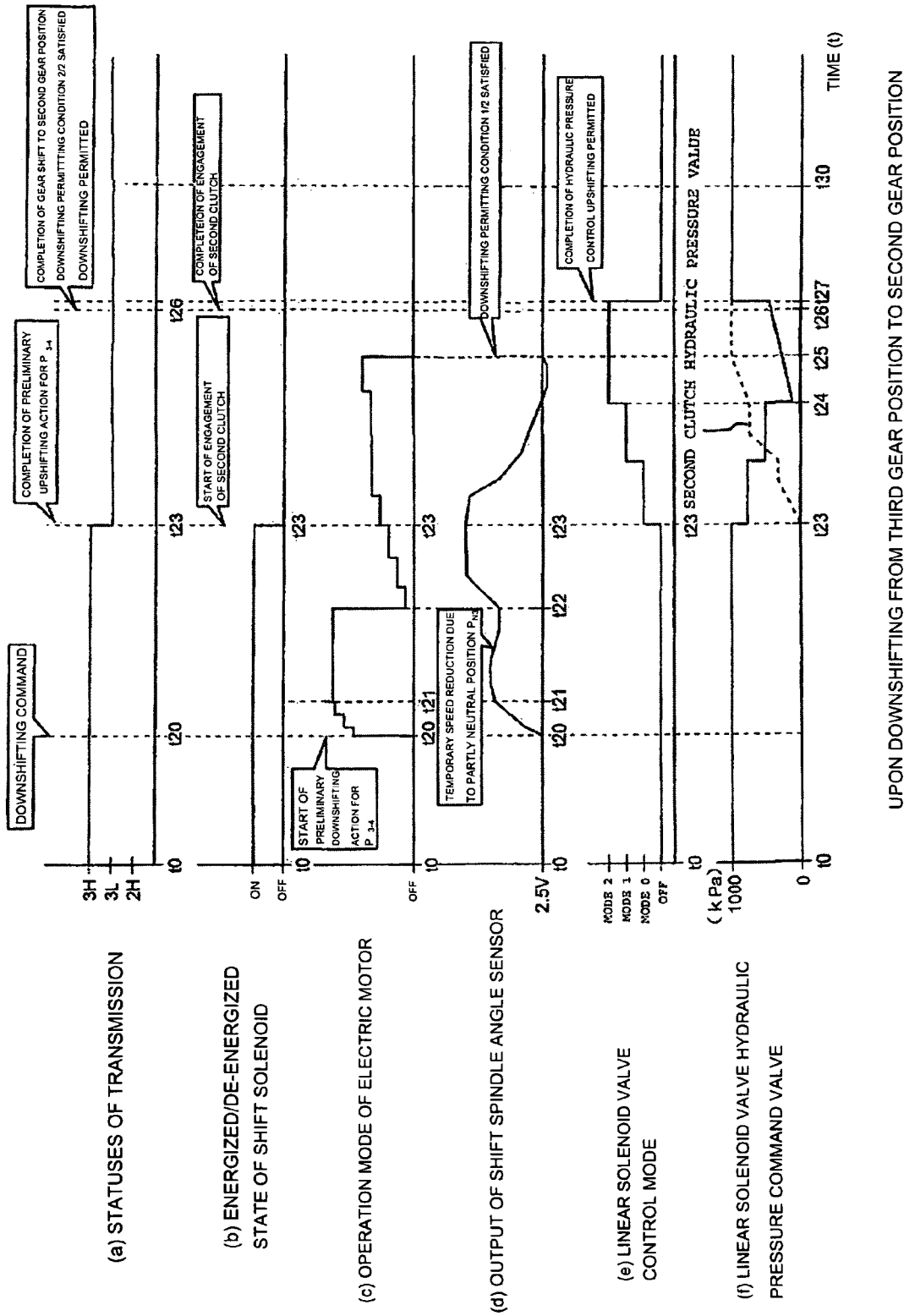
FIG. 12 shows timing charts ((a) through (f)) showing the operational states of various components in a preliminary downshifting action.

FIG. 12 shows timing charts ((a) through (f)) showing the operational states of various components in a preliminary downshifting action carried out when the transmission unit TM is downshifted from the third gear position to the second gear position.

As described above, while the vehicle is running in the third gear position, the preliminary upshifting action for turning the shift drum 44 to the angular position $P_{3-4}$ has been completed. Therefore, for downshifting the transmission to the second gear position, it is necessary to turn the shift drum 44 to the angular position $P_{2-3}$.

According to the present embodiment, the shift drum 44 is angularly rotated in advance to an angular position corresponding to a next gear position into which to downshift the transmission. Such an operation is referred to as a preliminary downshifting action. The automatic transmission assembly according to the present invention resides in that the preliminary downshifting action is completed at an earliest time to shorten the gear shifting time for downshifting.

When a downshifting command is received at time t20, the electric motor 48 simultaneously starts being energized for the preliminary downshifting action. As indicated by the output signal from the angle sensor 59, the shift drum 44 is angularly rotated through the partly neutral position $P_{N3}$ in a period from time t21 to time t22 to the angular position $P_{2-3}$ at time t23, whereupon the preliminary downshifting action is completed.

According to the present embodiment, when the preliminary downshifting action is completed at time t23, i.e., when the shift drum 44 is detected as having been angularly rotated to the angular position $P_{2-3}$ by the shift position sensor 70, the second clutch CL2 starts being engaged. Since such a clutch engagement timing ensures that the second clutch CL2 starts being engaged at the same time that the second clutch CL2 becomes capable of starting to be engaged, the downshift is completed within a shortest period of time.

The linear solenoid valve 28 starts to be controlled at time t23 in a mode 2 from time t24 to time t26 to adjust the supplied hydraulic pressure for minimizing gear shifting shocks as a hydraulic pressure command applied to the linear solenoid valve 28 is gradually incremented every 5 ms, as with the preliminary upshifting action. The shift spindle 52, which has started to be returned at time t23, is completely returned to its initial position at time t25, and a first downshifting permitting condition 1/2 is satisfied, as shown in the timing chart (d) of FIG. 12.

When the engagement of the second clutch CL2 is completed at time t26, the downshift to the second gear position is completed, and a second downshifting permitting condition 2/2 is satisfied, as shown in the timing chart (a) of FIG. 12, making it possible to carry out a next downshift. The actuation of the linear solenoid valve 28 is completed at time t27, making it possible to carry out a next upshift. The period of time from time t20 to time t30 is the same as the period of time from time t10 to time t30 shown in FIGS. 10(a) through 10(f). The above preliminary downshifting action is also carried when the transmission unit TM is downshifted from the fourth gear position to the third gear position and also from the second gear position to the first gear position.

Figure 13:
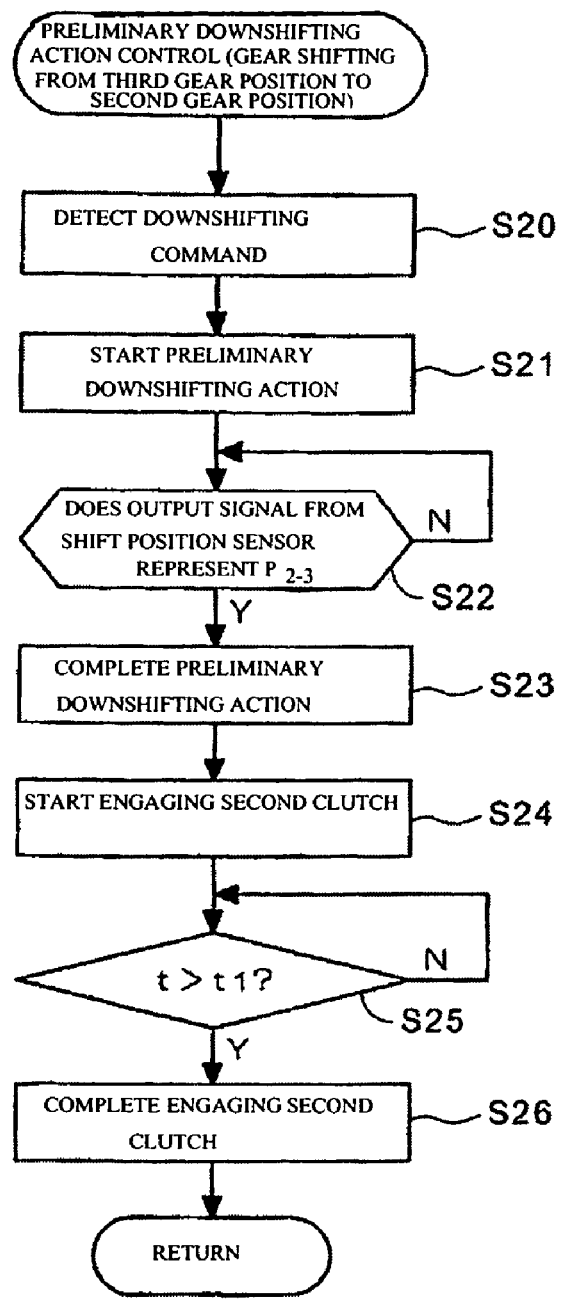
FIG. 13 is a flowchart showing a control flow of a preliminary downshifting action.

FIG. 13 is a flowchart of a control sequence of the preliminary downshifting action for downshifting from the third gear position to the second gear position. Steps in the flowchart shown in FIG. 13 which correspond to those in the timing charts (a) through (f) shown in FIG. 12 are indicated by the times used in the timing charts (a) through (f) shown in FIG. 12.

In step S20, the downshifting command is detected (time t20). Control then goes to step S21 in which the preliminary downshifting action starts being carried out (time t20). In step S22, it is determined whether the output signal from the shift position sensor 70 is of a value corresponding to the angular position $P_{2-3}$ or not. If it is judged in step S22 that the output signal from the shift position sensor 70 is of a value corresponding to the angular position $P_{2-3}$, then control goes to step S23 in which the preliminary downshifting action is completed (time t23).

In step S24, the second clutch CL2 starts being engaged (time t23). In step S25, it is determined whether the period of time t measured by a timer, which has elapsed from the start of engagement of the second clutch CL2, has exceeded a predetermined time t1 or not. If it is judged in step S25 that the period of time t has exceeded the given time t1, then control goes to step S26 in which the engagement of the second clutch CL2 is completed, and the downshift to the second gear position is completed (time t26). The control sequence shown in FIG. 13 is now put to an end.

With the automatic transmission assembly according to the present embodiment, as described above, when an upshifting command is output, the first clutch CL1 or the second clutch CL2 is engaged simultaneously with the upshifting command. The clutch is thus engaged at the earliest timing when the preliminary upshifting action can be started, and hence the upshifting time is shortened.

When a downshifting command is output, the preliminary downshifting action is carried out simultaneously with the downshifting command, and the first clutch CL1 or the second clutch CL2 is engaged in response to the detection by the shift position sensor 70 of the completion of the preliminary downshifting action. The clutch is thus engaged at the timing when the second clutch CL2 can start being engaged, and hence the downshifting time is greatly shortened.

Figure 14:
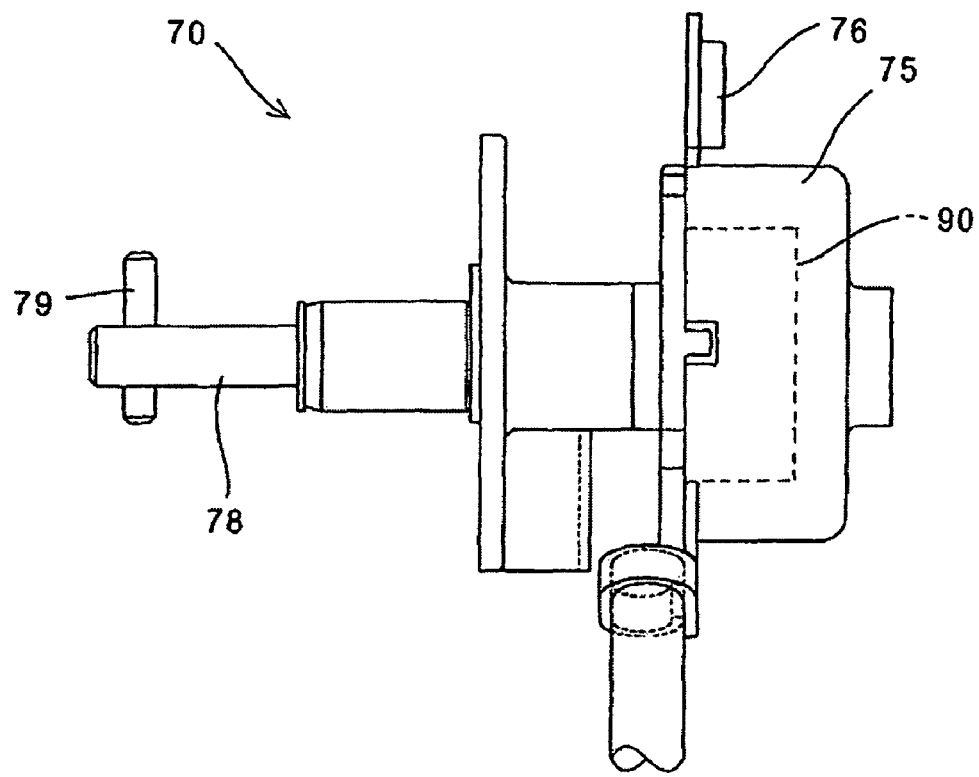
FIG. 14 is a front elevational view of a shift position sensor.
Figure 15:
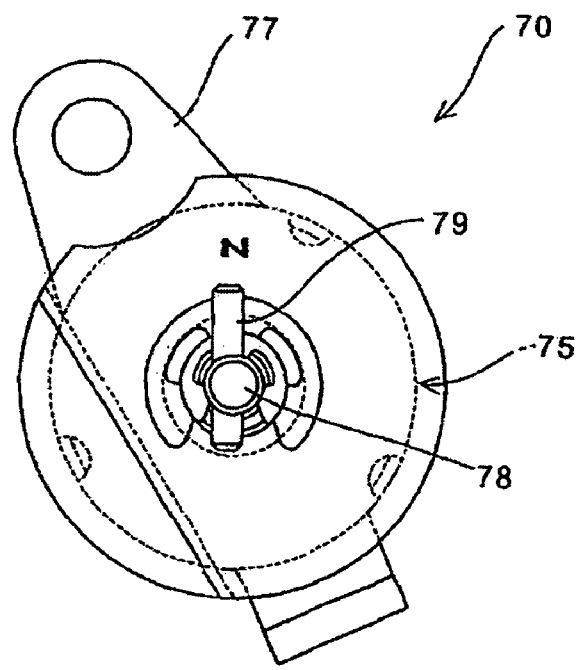
FIG. 15 is a side elevational view of the shift position sensor.

FIGS. 14 and 15 are front and side elevational views, respectively, of the shift position sensor 70. The shift position sensor 70 is an angle sensor having a housing 75 fixed to the crankcase 21 using a mounting stay 76, and a fixed contactor 90 and a movable contactor 80 (FIG. 16A) which are disposed in the housing 75.

The movable contactor is connected to a sensor shaft 78 having a positioning pin 79. When the positioning pin 79 engages in a slot (not shown) formed in the end of the shift drum 44, the shift drum 44 and the sensor shaft 78 are coupled to each other against relative rotation with respect to each other or for rotation in unison with each other.

FIG. 16A is a view showing the movable contactor 80 and the fixed contactor 90 of the shift position sensor 70, and FIG. 16B is a cross-sectional view taken along line J-J of FIG. 16A. The movable contactor 80, which is movable with respect to the fixed contactor 90, has a contact 81 formed of material having a metal or the like. The fixed contactor 90, which is fixed to the housing 75, has contacts $P_N$, $P_{1-2}$, $P_{N2}$, $P_{2-3}$, $P_{N3}$, $P_{3-4}$, $P_{N4}$, $P_{4-5}$, $P_R$, each made of metal or the like, aligned respectively with the recesses formed in the drum center 61 (see FIG. 8) for defining the angular positions for the shift drum 44. When the movable contactor 80 is angularly rotated in response to angular movement of the shift drum 44, the contact 81 of the movable contactor 80 is brought into contact with the fixed contactor 90 at successive positions thereon. Specifically, the shift position sensor 70 is capable of detecting the angular positions $P_N$, $P_{1-2}$, $P_{2-3}$, $P_{3-4}$, $P_{4-5}$, $P_R$, and the partly neutral positions $P_{N2}$, $P_{N3}$, $P_{N4}$.

FIG. 17A is a view showing another embodiment of the shift position sensor 70, and FIG. 17B is a cross-sectional view taken along line K-K of FIG. 17A.

A movable contactor 82 according to this embodiment has an outer contact 83 disposed in alignment with an outer circumferential portion of a fixed contactor 91, and an inner contact 84 disposed in alignment with an inner circumferential portion of the fixed contactor 91. The outer contact 83 and the inner contact 84 are electrically connected to each other and angularly movable in unison with the movable contactor 82. The fixed contactor 91 has contacts $P_N$, $P_{1-2}$, $P_{2-3}$, $P_{3-4}$, $P_{4-5}$, $P_R$ on the inner circumferential portion thereof, which correspond to the angular positions of the shift drum 44, and contacts $P_{N2}$, $P_{N3}$, $P_{N4}$ on the outer circumferential portion thereof, which correspond to the partly neutral positions of the shift drum 44.

When the transmission of the transmission unit TM is successively upshifted, the outer contact 83 and the inner contact 84 of the movable contactor 82 are brought into alternate contact with the contacts on the inner and outer circumferential portions of the fixed contactor 91. Therefore, the number of times that the contacts contact each other is reduced, resulting in a reduction in the wear of the many contacts. There are overlapping periods between the partly neutral positions $P_{N2}$, $P_{N3}$, $P_{N4}$ and the angular positions $P_{1-2}$, $P_{2-3}$, $P_{3-4}$, $P_{4-5}$, in which the movable contactor 82 contact two contacts at the same time. Since the output signal from the shift position sensor 70 is not interrupted between the partly neutral positions and the angular positions, any undesired disconnections of the circuit of the shift position sensor 70 can easily be detected.

Figure 18:
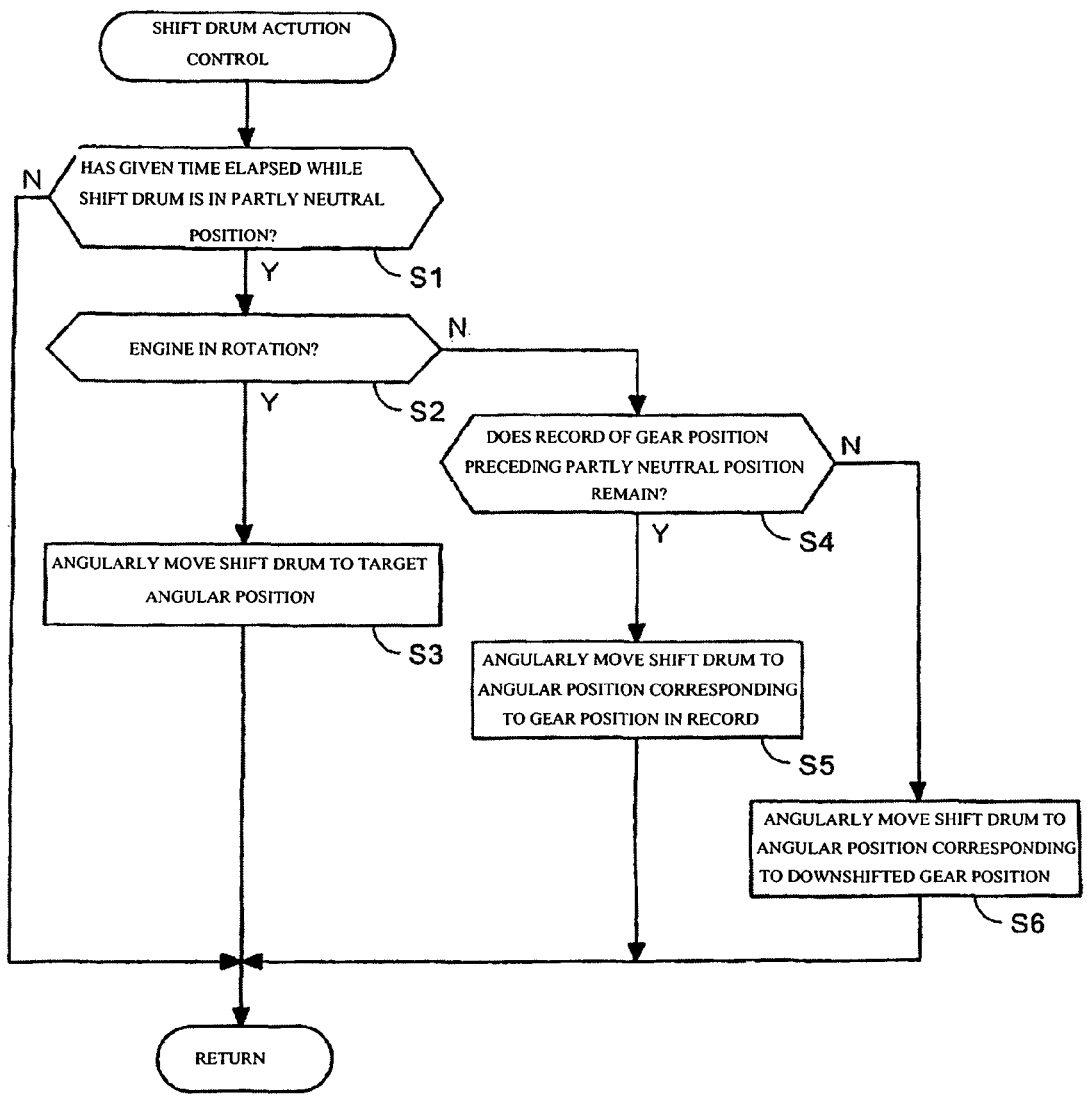
FIG. 18 is a flowchart of a shift drum control sequence according to an illustrative embodiment of the present invention.

FIG. 18 is a flowchart of a control sequence for controlling the shift drum 44 according to the present embodiment. In the automatic transmission assembly according to the present invention, the shift drum 44 (see FIG. 4) is rotated by the electric motor 48.

In the event of an electric power supply failure due to an ignition key turn-off or an engine stall while the transmission unit TM is changing gear positions, the shift drum 44 may possibly remain stuck in one of the partly neutral positions $P_{N2}$, $P_{N3}$, $P_{N4}$. The automatic transmission assembly according to the present embodiment is capable of detecting when the shift drum 44 is in one of the partially neutral positions and controlling a gear shift depending on the detected partially neutral position.

In step S1 shown in FIG. 18, it is determined whether a given period of time has elapsed or not by the shift position sensor 70 after the shift drum 44 has remained stuck in a partially neutral position. If it is judged that the given period of time has elapsed, then control goes to step S2. In step S2, it is determined whether the crankshaft 2 of the engine 1 is rotating or not.

If it is judged that the crankshaft 2 is rotating, i.e., the engine 1 is in normal operation, then the shift drum 44 is angularly rotated to a target angular position in step S3, after which the control sequence is ended. If it is judged that the crankshaft 2 (the engine 1) is not rotating in step S2, then control goes to step S4 in order to determine why the engine 1 has stopped.

In step S4, based on the information stored in a memory provided in the controller 100 or the like, it is determined whether the record of a gear position preceding the partially neutral position remains in the memory or not.

Since a RAM is used as the memory according to the present embodiment, the stored information in the memory disappears when the electric power supply on the vehicle is turned off by an ignition key. If it is judged that the record of the gear position preceding the partially neutral position remains in the memory, then the engine 1 is judged as being stalled while the electric power supply is on, and control goes to step S5. If it is judged that the record of the gear position preceding the partially neutral position does not remain in the memory, then the electric power supply is judged as being turned off by the ignition key and then turned on again, and control goes to step S6.

In step S5, the shift drum 44 is angularly rotated to the angular position corresponding to the record of the gear position which remains in the RAM. In step S6, the shift drum 44 is angularly rotated to the angular position corresponding to a downshifted gear position. Thereafter, the control sequence is put to an end.

According to the above control sequence for controlling the shift drum 44, it is possible to control gear shifting depending on a partly neutral position. For example, if the electric power supply is turned off while the shift drum 44 is being angularly rotated and the shift drum 44 is stopped in a partially neutral position, and thereafter the electric power supply is turned on again, the shift drum 44 can be angularly rotated to an appropriate angular position at the same time that the electric power supply is turned on, allowing the vehicle to restart smoothly.

In step S6, at the same time that the electric power supply is turned on, the output signal from the vehicle speed sensor or the like may be detected, and the shift drum 44 may be angularly rotated to an upshifted gear position based on the information represented by the detected output signal from the vehicle speed sensor or the like. Furthermore, when the vehicle is stopped in the partly neutral position $P_{N4}$, for example, if the stoppage of the vehicle is detected by the vehicle speed sensor at the time the electric power supply is turned on again, the shift drum 44 may be angularly rotated to the angular position $P_{1-2}$ or the like corresponding to a low gear position suitable for starting the vehicle.

With the automatic transmission assembly according to the illustrative embodiments, as described above, since a partially neutral position intermediate between angular positions of the shift drum is detected by the shift position sensor, it is possible to control gear shifting depending on the partially neutral position.

Therefore, even if the engine is stopped while the shift drum is in a partly neutral position, the shift drum is in a clear position when the engine is stared again, allowing appropriate shift drum actuation control to be continued.

The automatic transmission assembly described above is applicable to power sources on various vehicles, e.g., multi-cylinder engines on two-wheeled motor vehicles and four-wheeled motor vehicles. The process of controlling the electric motor and the linear solenoid valve may be modified in various ways depending on the type of the power source (engine).

The number of gear positions of the transmission, the shape of the drum center, the shapes of the fixed and movable contactors in the shift position sensor, and the process of controlling the shift drum based on the detected signal representative of the partly neutral positions are not limited to those in the above embodiment, but may be modified in various ways.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An automatic transmission assembly for transmitting rotary power from a crankshaft to a drive train component, said automatic transmission assembly comprising:
    a main shaft operatively connected to said crankshaft;
    an auxiliary shaft operatively connected to said main shaft;
    a transmission unit having a plurality of gear pairs which provide a plurality of gear positions between said main shaft and said auxiliary shaft;
    a twin clutch assembly comprising a first clutch and a second clutch disposed on one of said main shaft and said auxiliary shaft, respectively, said twin clutch assembly configured to selectively and operatively transmit rotary drive power from the crankshaft to said transmission unit;
    a shift drum operatively connected to the transmission unit;
    a shift fork selectively engagable with the shift drum;
    a shift position sensor for detecting an angular position of said shift drum; said shift position sensor being operatively connected to said shift drum;
    a controller which is operable to select an operative angular position of the shift drum for actuating the shift fork;
    said controller controlling engagement and disengagement of said twin clutch assembly for selecting one of said plurality of gear pairs to transmit said rotary drive power from the crankshaft to said transmission unit;
    wherein said transmission unit shifts transmission of said rotary drive power between two adjacent gear positions of said plurality of gear positions in response to switching of said first clutch and said second clutch into and out of engagement position when said shift drum is in a predetermined angular position for one of said plurality of gear positions,
    wherein said controller performs a preliminary upshifting action in advance by angularly moving said shift drum to a first selected angular position based on a next gear position in an upshifting direction while said rotary drive power from the crankshaft to the transmission unit is being maintained at a present gear position,
    wherein when an upshifting command is output, said controller engages one of said first clutch and said second clutch with said crankshaft depending on the upshifting command,
    and when a downshifting command is output, said controller performs a preliminary downshifting action in advance for angularly moving said shift drum to a second selected angular position based on a next gear position in a downshifting direction based on said downshifting command, and
    when the shift position sensor detects a completion of said preliminary downshifting action based on said selected second angular position of said shift drum, said controller operatively engages one of said first clutch and said second clutch with said crankshaft.

2. The automatic transmission assembly according to claim 1, further comprising a hydraulic pressure generating unit and an electric motor, wherein said twin clutch assembly is actuated by applying hydraulic pressure generated by said hydraulic pressure generating unit, and said shift drum is actuated by said electric motor.

3. The automatic transmission assembly according to claim 1, wherein said first clutch operatively and selectively transmits said rotary drive power from the crankshaft to one of said plurality of gear pairs in an odd-numbered gear position, and said second clutch selectively transmits rotary drive power to one of said plurality of gear pairs in an even-numbered gear position.

4. The automatic transmission assembly according to claim 2, wherein said first clutch operatively and selectively transmits said rotary drive power from the crankshaft to one of said plurality of gear pairs in an odd-numbered gear position, and said second clutch selectively transmits rotary drive power to one of said plurality of gear pairs in an even-numbered gear position.

5. The automatic transmission assembly according to claim 1, wherein a partially neutral position is provided between predetermined angular positions of said shift drum, and wherein said partially neutral position is configured to temporarily reduce the angular speed of said shift drum when the shift drum is being angularly rotated.

6. The automatic transmission assembly according to claim 2, wherein a partially neutral position is provided between predetermined angular positions of said shift drum, and wherein said partially neutral position is configured to temporarily reduce the angular speed of said shift drum when the shift drum is being angularly rotated.

7. The automatic transmission assembly according to claim 3, wherein a partially neutral position is provided between predetermined angular positions of said shift drum, and wherein said partially neutral position is configured to temporarily reduce the angular speed of said shift drum when the shift drum is being angularly rotated.

8. An automatic transmission assembly for transmitting rotary power from a crankshaft to a drive train component, said automatic transmission assembly comprising
a main shaft operatively connected with said crankshaft;
an auxiliary shaft operatively connected with said main shaft;
a transmission unit having a plurality of gear pairs which provide a plurality of gear positions between the main shaft and the auxiliary shaft;
a twin clutch assembly having a first clutch and a second clutch disposed on one of said main shaft and said auxiliary shaft; said twin clutch assembly selectively and operatively transmitting a rotary drive power from the crankshaft to said transmission unit;
a shift drum operatively connected to the transmission unit;
a shift fork selectively engagable with the shift drum;
a shift position sensor which detects an angular position of said shift drum; said shift position sensor being operatively connected to said shift drum;
a controller which changes angular positions of the shift drum for actuating the shift fork; and
said controller providing an engagement and a disengagement position of said twin clutch assembly for selecting one of said plurality of gear pairs to transmit said rotary drive power from the crankshaft to said transmission unit;
wherein:
said transmission unit shifts transmission of said rotary drive power between adjacent two of said plurality of gear positions in response to switching of said first clutch and said second clutch into and out of engagement position when said shift drum is in a predetermined angular position for a selected gear position;
said shift drum comprises a partially neutral position disposed thereon between said predetermined angular positions of said shift drum;
said partially neutral position is configured to temporarily reduce the angular speed of said shift drum when the shift drum is being angularly rotated; and
the shift position sensor detects said predetermined angular positions and said partially neutral position.

9. The automatic transmission assembly according to claim 8, further comprising an electric motor operatively connected to the shift drum;
wherein when said shift drum remains in the partially neutral position for a predetermined period of time, said controller controls the electric motor to angularly rotate said shift drum to a selected angular position corresponding to one of selected gear position in one of an upshifting direction and a downshifting direction irrespective of rotation of the crankshaft.

10. The automatic transmission assembly according to claim 8, further comprising an electric motor operatively connected to said shift drum;
wherein said shift drum is angularly rotated by said electric motor energized by a common electric power supply which also supplies power to an engine operatively coupled with the transmission unit;
when said electric power supply is turned off to stop said shift drum in said partially neutral position, said controller controls the electric motor to angularly rotate said shift drum to an angular position corresponding to the gear position in one of an upshifting direction and a downshifting direction when said electric power supply is turned on subsequently.

11. The automatic transmission assembly according to claim 8, further comprising a hydraulic pressure generating unit and an electric motor; wherein said twin clutch assembly is actuated by applying hydraulic pressure generated by said hydraulic pressure generating unit, and said shift drum is actuated by said electric motor.

12. The automatic transmission assembly according to claim 8, wherein said first clutch operatively and selectively transmits said rotary drive power from the crankshaft to one of said plurality of gear pairs in an odd-numbered gear position, and said second clutch selectively transmits rotary drive power to one of said plurality of gear pairs in an even-numbered gear position.

13. The automatic transmission assembly according to claim 8, further comprising an electric motor operatively connected to said shift drum, and a hydraulic pressure generating unit operatively connected to said twin clutch assembly;
wherein said controller performs a preliminary downshifting action in advance by controlling the electric motor to angularly rotate said shift drum to an angular position depending on a next gear position in a downshifting direction based on said downshifting command, and
when the shift position sensor detects a completion of said preliminary downshifting action based on said angular position of said shift drum, said controller controls the hydraulic pressure generating unit to operatively engages one of said first clutch and said second clutch with said crankshaft.

14. A vehicle comprising a power unit including a crankcase, a crankshaft rotatably supported in the crankcase, and a transmission assembly operatively connected to said crankshaft;
said transmission assembly comprising:
a main shaft operatively connected with said crankshaft;
an auxiliary shaft operatively connected with said main shaft;
a transmission unit having a plurality of gear pairs which provide a plurality of gear positions between the main shaft and the auxiliary shaft;
a pair of clutches having a first clutch and a second clutch disposed on said main shaft, said pair of clutches selectively and operatively transmitting a rotary drive power from the crankshaft to said transmission unit;
a shift drum operatively connected to the transmission unit; said shift drum comprising a plurality of angular positions corresponding to said plurality of gear positions;
a shift fork selectively engagable with the shift drum;
a shift position sensor which detects an angular position of said shift drum; said shift position sensor being operatively connected to said shift drum;
a controller which changes an angular position of the shift drum for actuating the shift fork;
said controller selectively engaging one of said first clutch and said second clutch with said crankshaft to transmit said rotary drive power from the crankshaft to said transmission unit;
wherein said transmission unit shifts transmission of said rotary drive power between adjacent two of said plurality of gear positions by selectively engaging one of said first clutch and said second clutch when said shift drum is in a predetermined angular position for a selected gear position,
said controller performs a preliminary upshifting action in advance by controlling angular rotation of said shift drum to a first selected angular position based on a next gear position in an upshifting direction while said rotary drive power from the crankshaft to the transmission unit is being maintained at a present gear position, wherein when an upshifting command is output, said controller engages one of said first clutch and said second clutch depending on the upshifting command, when a downshifting command is output, said controller performs a preliminary downshifting action in advance by controlling angular rotation of said shift drum to a second selected angular positions depending on a next gear position in a downshifting direction based on said downshifting command, and when the shift position sensor detects a completion of said preliminary downshifting action based on said second selected angular position of said shift drum, said controller operatively engages one of said first clutch and said second clutch with said crankshaft.

15. A vehicle according to claim 14, further comprising a hydraulic pressure generating unit and an electric motor; wherein pair of clutches are actuated by applying hydraulic pressure generated by said hydraulic pressure generating unit, and said shift drum is actuated by said electric motor.

16. A vehicle according to claim 14, wherein said first clutch operatively and selectively transmits said rotary drive power from the crankshaft to one of said plurality of gear pairs in an odd-numbered gear position, and said second clutch selectively transmits rotary drive power to one of said plurality of gear pairs in an even-numbered gear position.

17. A vehicle according to claim 14, wherein when said upshifting command is output, said controller performs said preliminary upshifting action simultaneously with said upshifting command.

18. A vehicle according to claim 14, wherein when said downshifting command is output, said controller performs said preliminary downshifting action simultaneously with said downshifting command.

19. A vehicle according to claim 14, wherein said shift drum further comprises a plurality of partially neutral positions formed thereon between selected angular positions;

wherein said partially neutral positions are configured to temporarily reduce the angular speed of said shift drum when the shift drum is being angularly rotated; and the shift position sensor detects said partially neutral positions.

20. A vehicle according to claim 14, wherein said shift position sensor comprises a housing fixedly attached to said crankcase;

a fixed contactor fixedly disposed in the housing and having a plurality of contact points for angular positions and partially neutral positions corresponding to said angular positions and said partially neutral positions of said shift drum, respectively; and a movable contactor rotatably disposed in the housing, and having a contact point;

wherein said moveable contactor is angularly rotated in response to angular rotation of the shift drum;

the contact of the movable contactor comes in contact with one of said plurality of contact points of the fixed contactor so as to determine an angular position of said shift drum.

* * * * *